United States Patent
Foody et al.

(10) Patent No.: US 7,330,889 B2
(45) Date of Patent: Feb. 12, 2008

(54) NETWORK INTERACTION ANALYSIS ARRANGEMENT

(75) Inventors: Daniel M Foody, Mountain View, CA (US); Michael R Clements, San Carlos, CA (US)

(73) Assignee: Actional Corporation, Mountain View, CA (US)

( * ) Notice: Subject to any disclaimer, the term of this patent is extended or adjusted under 35 U.S.C. 154(b) by 655 days.

(21) Appl. No.: 10/379,894

(22) Filed: Mar. 6, 2003

(65) Prior Publication Data

US 2004/0177141 A1 Sep. 9, 2004

(51) Int. Cl.
G06F 15/173 (2006.01)
(52) U.S. Cl. .................................... 709/224; 709/223
(58) Field of Classification Search ........ 709/223–224, 709/238, 217, 226
See application file for complete search history.

(56) References Cited

U.S. PATENT DOCUMENTS

| | | | | |
|---|---|---|---|---|
| 5,282,270 A | 1/1994 | Oppenheimer et al. | ..... | 395/200 |
| 5,293,635 A | 3/1994 | Faulk, Jr. et al. | ........... | 395/800 |
| 5,684,959 A | 11/1997 | Bhat et al. | .............. | 395/200.11 |
| 5,687,320 A | 11/1997 | Wiley et al. | ........... | 395/200.16 |
| 5,708,772 A | 1/1998 | Zeldin et al. | .......... | 395/183.01 |
| 5,835,720 A | 11/1998 | Nelson et al. | ......... | 395/200.54 |
| 5,845,081 A | 12/1998 | Rangarajan et al. | ... | 395/200.54 |
| 5,864,662 A | 1/1999 | Brownmiller et al. | . | 395/183.19 |
| 5,890,165 A | 3/1999 | Boudrie et al. | ............. | 707/202 |
| 5,935,210 A | 8/1999 | Stark | .......................... | 709/224 |
| 6,038,538 A | 3/2000 | Agrawal et al. | ................ | 705/7 |
| 6,052,727 A | 4/2000 | Kamalanathan | ............. | 709/224 |
| 6,072,777 A | 6/2000 | Bencheck et al. | .......... | 370/244 |
| 6,108,702 A | 8/2000 | Wood | .......................... | 709/224 |
| 6,138,122 A | 10/2000 | Smith et al. | ................. | 707/103 |
| 6,182,136 B1 | 1/2001 | Ramanathan et al. | ....... | 709/224 |
| 6,220,768 B1 | 4/2001 | Barroux | .................. | 395/200.54 |
| 6,243,746 B1 | 6/2001 | Sondur et al. | .............. | 709/220 |
| 6,249,814 B1 | 6/2001 | Shaffer et al. | .............. | 709/223 |
| 6,269,401 B1 * | 7/2001 | Fletcher et al. | ............. | 709/224 |
| 6,286,047 B1 | 9/2001 | Ramanathan et al. | ....... | 709/224 |
| 6,321,264 B1 * | 11/2001 | Fletcher et al. | ............. | 709/224 |
| 6,363,477 B1 * | 3/2002 | Fletcher et al. | ............. | 713/151 |
| 6,493,318 B1 * | 12/2002 | Bare | .......................... | 370/238 |
| 6,535,227 B1 * | 3/2003 | Fox et al. | .................... | 715/736 |
| 6,665,268 B1 * | 12/2003 | Sato et al. | .................. | 370/242 |

(Continued)

OTHER PUBLICATIONS

Drogseth, Dennis; "Product Focus: Digging for the Root Cause of Network Problems," WWW.NETWORKMAGAZINE.COM, pp. 1-4, Dec. 3, 2001.

(Continued)

*Primary Examiner*—Ario Etienne
*Assistant Examiner*—Hussein A El-chanti
(74) *Attorney, Agent, or Firm*—Fitzpatrick, Cella, Harper & Scinto

(57) ABSTRACT

In a network through which service providing nodes are interconnected, one or more software elements at each service providing node process the network operations. A client interceptor coupled in an examine node to a selected software element intercepts transmissions from the software element to record transmission flow control information. A server interceptor coupled in the examine mode to the selected software element intercepts transmissions to the software element to record transmission flow control information. An administrative node of the network examines the transmission flow control information from the selected software elements to assess network operation.

56 Claims, 17 Drawing Sheets

U.S. PATENT DOCUMENTS

| | | | |
|---|---|---|---|
| 6,683,856 B1 * | 1/2004 | Brinkman et al. | 370/249 |
| 6,985,940 B1 * | 1/2006 | Jenkin | 709/224 |
| 6,990,071 B2 * | 1/2006 | Adam et al. | 370/230 |
| 7,032,063 B1 * | 4/2006 | Kurpanek | 710/316 |

OTHER PUBLICATIONS

Drogseth, Dennis; "The Two Sides to System Analysis", WWW.NWFUSION.COM, pp. 1-4, Dec. 3, 2001.

Roushanaee, Babak; "Delving into Service Outages", WWW.NETWORKCOMPUTING.COM, pp. 1-4, Dec. 3, 2001.

Gudgin et al., Editors, "Soap Version 1.2 Part 1: Messaging Framework, W3C Working Draft 2 Oct. 2001", HTTP://WWW.W3.ORG/TR/2001/WD-SOAP12-PART1-20011002/, (WWW.W3.ORG), pp. 1-35, Dec. 3, 2001.

Roy et al., "A Modeling Approach to Root-Cause Analysis", New Product Review: Patrol for Diagnostic Management, WWW.BMC.COM, pp. 1-8, Dec. 3, 2001.

Drogseth, Dennis, "Two Worlds Collide", WWW,ITWORLD.COM, pp. 1-3, Dec. 3, 2001.

\* cited by examiner

NETWORK INTERACTION ANALYSIS ARRANGEMENT

FIELD OF THE INVENTION

The invention relates to networks utilizing service providing software elements to perform network tasks, and, more particularly, to arrangements for analyzing interactions among and assessing operability of the software elements providing services in the network.

BACKGROUND OF THE INVENTION

Computer networks were formerly designed using a central computer (mainframe) accessed by plural user terminals via network connections wherein different users accessed applications and data stored in the mainframe. In currently designed networks, processing is distributed among devices of many types using peer-to-peer communication. In distributed networks, a number of computers operate as servers, which are accessible by client computers. Each server may provide one or more services. A server may, in turn, be a client for services of another serving computer that acts a server. In providing services, the servers often communicate with each other by an arrangement of network devices including routers, hubs, switches and firewalls. FIG. 1 shows an example of a network in which plural nodes including at least two segments 100 and 150 are connected to network coupler 130. In the segment 100, nodes 101 through 112 are interconnected by a bus 118. A router 115 connects the segment 100 to the network coupler 130. In the segment 150, nodes 151 to 162 are interconnected by a bus 168 and a router 165 connects the segment 150 to the network coupler 130. An Administrative node 450 is also connected to the network to monitor, control, examine and evaluate network functioning.

It is well known in network systems for nodes to use the seven-layer OSI (Open Systems Interconnect) model such as shown in FIG. 2. The OSI model has a physical layer 1 denoted as 200, a data link layer 2 denoted as 210, a network layer 3 denoted as 220, a transport layer 4 denoted as 230, a session layer 5 denoted as 240, a presentation layer 6 denoted as 250 and an application layer 7 denoted as 260. In the OSI arrangement of FIG. 2, control is passed from one layer to the next in a layer hierarchy starting, outgoing, at the top application layer 7 of one system, proceeding to the bottom physical layer 1, and, incoming, back up the layers of the other system from the bottom physical layer 1 to the top application layer 7. A server generally provides seven layers but other network devices may provide fewer layers. For example, a router typically is responsible for four layers.

More recently, application platforms have been introduced as a new category. Such application platforms (e.g., Microsoft .NET, J2EE and database application servers) provide common shared facilities for networked applications that run on the application platform extending from the presentation layer 6. While an application platform in a computer appears as one OSI layer 7 application, it hosts one or more independent applications and each of the independent applications may host one or more software elements that provide different services. FIG. 3 shows a portion of such an OSI model in which an extended model application platform layer 7 (310), extended model layer 8 application layers (320-1 to 320-M) and extended model service layers 9 (330-1 to 330-N) are inserted in that order in the OSI application layer 7 (260) to provide n software elements.

A network generally spans many computers and a software element of the network may interact with one or more software elements that are co-located within the same application or application platform. The software elements, however, only interact through a well-defined isolation boundary (e.g., an Application Programming Interface (API), an object oriented interface, a messaging system, etc.). Such isolation allows location transparency so that the same unmodified software elements having different interfacing may be located at different machines with communication through the physical network. The use of isolation boundaries allows independent implementation of services so that a service can be replaced without modifying the service dependent thereon and a referenced service can be handled by a proxy service that manages network transmission to the real service location.

Physical networks vary in complexity from a few computers and network devices for a small business to millions of computers interconnected through the Internet. The complexity of typical network topologies has led to development of numerous systems that aid network administrators in understanding and managing their networks including determining the network elements and their interdependencies. In the Automatic Discovery of Network element system disclosed in U.S. Pat. No. 5,185,860 issued to J. C. Wu Feb. 9, 1993, discovery nodes on a network convey knowledge of the existence of other nodes on the network. As disclosed therein, a network discovery system queries the discovery agents and obtains information from the discovery agents about other nodes on the network. The discovery system then queries each of the nodes obtained to determine if that node is also a discovery agent. The process of querying discovery agents to obtain a list of nodes known to the discovery agents is repeated at timed intervals to obtain information about nodes that are not always active. In a TCP/IP network, for example, discovery agents are nodes that respond to queries for an address translation table that translates Internet protocol (IP) addresses to physical addresses. The data from each node's address translation table is used to obtain both the IP and the physical address of other nodes on the network. These nodes are then queried to obtain additional information. After all the nodes on a network are discovered, the list of nodes is written to a database where it can be displayed by the network manager or other users of the network.

U.S. Pat. No. 6,286,047 issued to Ramanathan et al. Sep. 4, 2001 discloses a method for identifying services, service providing elements and dependencies among the services and elements providing services in which first and second phases of discovery are executed. In the first phase, the services and elements providing services are detected as well as a first set of dependencies. The second phase based on results of the first phase detects inter-service dependencies, i.e., conditions in which proper operation of one service relies upon at least one other service. Various techniques may be used in executing the first phase, including accessing information in a domain name service (DNS) of the network to identify dependencies, as well as services and nodes. Discovery within the first phase may also be based upon recognizing naming conventions. In the second phase, discovery agents implemented in computer software may be deployed to access content of configuration files of applications detected in the first phase. Discovery agents may also be used to monitor connections completed via specified nodes detected in the first phase, such that other inter-service dependencies are identified. Alternatively, network probes may be deployed to access information of data packets transmitted between nodes detected in the first phase, with the accessed packet information being used to detect inter-service dependencies.

U.S. Pat. No. 6,115,393 issued Sep. 5, 2000 to Engel et al. discloses a network arrangement in which plural communication dialogs occurring among network nodes are monitored. In the dialogs, the contents of packets being transmitted among two or more communicating nodes are detected on the network. The dialogs are identified from the contents of the packets and information about the identified dialogs derived from the packet contents is stored. Each communication is effected by a transmission of one or more packets among two or more communicating nodes. Each communication complies with a predefined communication protocol selected from among protocols available in the network. The contents of packets are detected passively by monitors on network busses in real time. Communication information associated with multiple protocols is derived from the packet contents.

In the foregoing prior art patents, network nodes and their interdependencies for nodes that are network devices, computers and OSI layer 7 applications are discovered by reading machine directory services (Domain Name Service DNS) or broadcasting across networks and watching for responses. Such discovery arrangements are passive in that they detect nodes without becoming involved in the operation of the nodes by inspecting node information such as logs, configuration, etc. and produce a static model of the network that identifies node interaction. These known systems, however, do not produce a snapshot identifying which nodes of a network are currently interacting with which other nodes of the network while a particular network task is being performed and are limited to discovering interdependencies among service providing software elements where there is at most one software element per OSI layer 7 application. As the use of application platforms increases in the known systems, the limitation of one software element per application layer, which treats the entire application platform as one node regardless of how many service providing software elements are hosted, incorrectly identifies multiple software elements as one node in a network and is too restrictive. Where, as in the prior art, the entire contents of an application platform are treated as one node, discovery of interdependencies that relies on generically shared resources such as configuration files, logs, communication ports and operating system processes does not provide adequate detection of multiple services and interdependencies of plural software elements of the application platform.

In view of the interdependencies among services performed by the software elements in a network, failure of one software element usually adversely affects many other software elements in a network either directly where there is a direct dependence on the failed software element or indirectly where the dependence is through one or more other software elements. As a result, failure of one software element in a network may have a ripple effect with failure symptoms appearing in many other network software elements. Accordingly, it is a time consuming effort to analyze root cause of failure. Multiple root failures are known to occur at the same time so that it is necessary to perform a time-consuming detailed examination of every node that experienced a failure. Where each node may have many service providing software elements as shown in the application platform arrangement of FIG. 3, the process is exceedingly difficult since each detected software element must be individually checked.

BRIEF SUMMARY OF THE INVENTION

The invention is directed to a network having plural service providing nodes in which the operation of the service providing nodes is examined to monitor network task processing.

According to one aspect of the invention, each service providing node includes one or more software elements and the software elements in the same and different service providing nodes interact to perform network tasks. At least one of transmissions from a software element and transmissions to a software element are intercepted at an interceptor coupled to the software element to record information pertaining to the transmissions. The interactions among the software elements are examined responsive to the transmission pertaining information records.

According to another aspect of the invention, the transmissions from a software element are intercepted by a first interceptor and the transmissions to the software element are intercepted by a second interceptor.

According to yet another aspect of the invention, the software elements to which the first and second interceptors are coupled are selected for the examination and the transmission information pertaining records of the first and second interceptors coupled to the selected software element are stored in the software element.

According to yet another aspect of the invention, the transmission information pertaining records from selected software elements are combined to form a set of records of interactions of the software elements of the service providing nodes.

According to yet another aspect of the invention, each transmission information pertaining record of a selected software element has a logical thread identifier that identifies a network task of the selected software element, and a group of the information pertaining records of the network task identified by the logical thread identifier are combined.

According to yet another aspect of the invention, each transmission information pertaining record in the network task group has a chain correlation identifier identifying an operation of the selected software element in the network task and an interaction correlation identifier identifying an interaction of the software element with another software element. A set of interaction records including data of transmission information pertaining records of the network task are generated according to the chain correlation identifiers and the interaction correlation identifiers.

According to yet another aspect of the invention, the first interceptor is inserted at an outgoing side of the selected software element isolated from the operation of the selected software element and the second interceptor is inserted at an incoming side of the selected software element isolated from the operation of the selected software element so that the operation of the selected software element is not affected by the inserted first and second interceptors.

According to yet another aspect of the invention, the transmission pertaining information record includes data of at least one of response time and error states of an interaction between the software element and another software element and data of a time of occurrence of the interaction.

According to yet another aspect of the invention, a statistical record is formed at the interceptor coupled to the selected software element in response to the transmission pertaining information that has data of at least one of interaction counts, failure counts, average response time of a software element, average response time of a software element when serving requests from another specific software element, percentage of calls to a specific software element that came from another specified software element and percentage of calls from a specified software element that are sent to another specified software element.

According to yet another aspect of the invention, when a network task is initiated, a network task identifier is generated in the selected software element initiating the network task for transmission to the software elements engaged in the network task.

According to yet another aspect of the invention, when a selected software element sends a request transmission, an identifier identifying an operation of the selected software element and an identifier identifying an interaction between the software element and a selected software element receiving the request transmission is created or recorded by the first interceptor and the software element operation identifier is associated with the interaction identifier.

According to yet another aspect of the invention, when the request transmission is received by a receiving software element, an identifier identifying the operation of the receiving software element is created or recorded by the second interceptor of the receiving software element, the receiving software element identifier is associated with the interaction identifier identifying the interaction between the selected receiving software element and the selected software element sending the request transmission and the interaction identifier and the interaction identifier is recorded by the second interceptor inserted at the receiving software element.

According to yet another aspect of the invention, when a reply transmission is sent from the selected software element receiving the request, the association of the interaction identifier with the software element identifier is removed in the second interceptor inserted at the selected software element sending the reply transmission.

According to yet another aspect of the invention, when a reply transmission is received by a selected software element, the association of the interaction identification with the software element operation identifier is removed in the first interceptor inserted at the selected software element receiving the reply transmission, According to yet another aspect of the invention, errors and/or failures in the transmission pertaining information are detected in the interceptor of selected software elements engaged in the network task and the notification of the detected errors and/or failures by the selected software element to an examination unit. In response, the examination unit requests transmission pertaining information records of the network task in which the errors and/or the failures were detected from the selected software elements.

In an embodiment of the invention, network tasks are performed by software elements of network service providing nodes. Each service providing node has one or more software elements and each software element has a software module at the node that utilizes node processing devices to perform its operations. In each node, the one or more software elements may be arranged on an application platform of OSI application layer 7. The software elements of the same and different nodes interact with each other in performing a network task. An administrative node may request examination of interactions among selected software elements through client and server interceptors inserted at the isolation point inputs and outputs of the software elements. Upon selection of software elements for examination, each client interceptor intercepts transmissions from a software element to form a record of transmission flow control information and each server interceptor intercepts transmission to a software element to form a record of transmission flow control information. An aggregate statistical record of the selected software element interactions is also formed and stored at each selected software element. A set of recent transmission flow control information records and the aggregate statistical record are stored at the selected software elements.

In each interaction between software elements, the network task being performed by the software elements is identified by a logical thread identifier. The software element operation of the network task is identified by a chain correlation identifier and the software element interaction is identified by an interaction correlation identifier created at the start of the interaction. Upon request of the administrative node, the transmission flow control information records and the aggregate statistical records of the selected software elements are transmitted to the administrative node wherein the transmission flow control information records are combined to form a set of software element interaction records according to interceptor record logical thread, client correlation and interaction correlation identifiers to assess the operability of the software elements in the network task and to locate erroneously operating software elements. Upon detection of an error or failure in the transmission flow control information at an interceptor, the administrative node is notified of the error or failure and requests transfer of the transmission flow control information from selected software elements engaged in the network task.

DETAILED DESCRIPTION

In the following, a software element includes a software unit stored in a node memory and associated processing devices hosted on an application or an application platform of a node that offers to a user or to other software elements a functionality to perform a specific set of related operations. Interactions of software elements include messages, events, transactions, calls or invocations between one software element and one or more other software elements. An interaction which is initiated from a client to a server may be a request and reply or may involve only a request flowing in one direction. Each software element is logically isolated from other software elements by the network, API, a software interface or other isolation mechanism. An interception includes insertion of server and/or client interceptors at input and output isolation boundaries of software elements participating in a network task so that the interceptors enter into the flow of control between software elements without modifying the software element. A client interceptor operates to intercept a request sent from a software element to one or more software elements and to intercept replies from the from other software elements. A server interceptor intercepts requests from one or more software elements and intercepts replies that are returned to one or more software elements. A software element engaged in a network task, however, may have only a client interceptor inserted at its output or only a server interceptor inserted at its input. One or more software elements engaged in a network task may not have any inserted interceptor.

Figure 1:
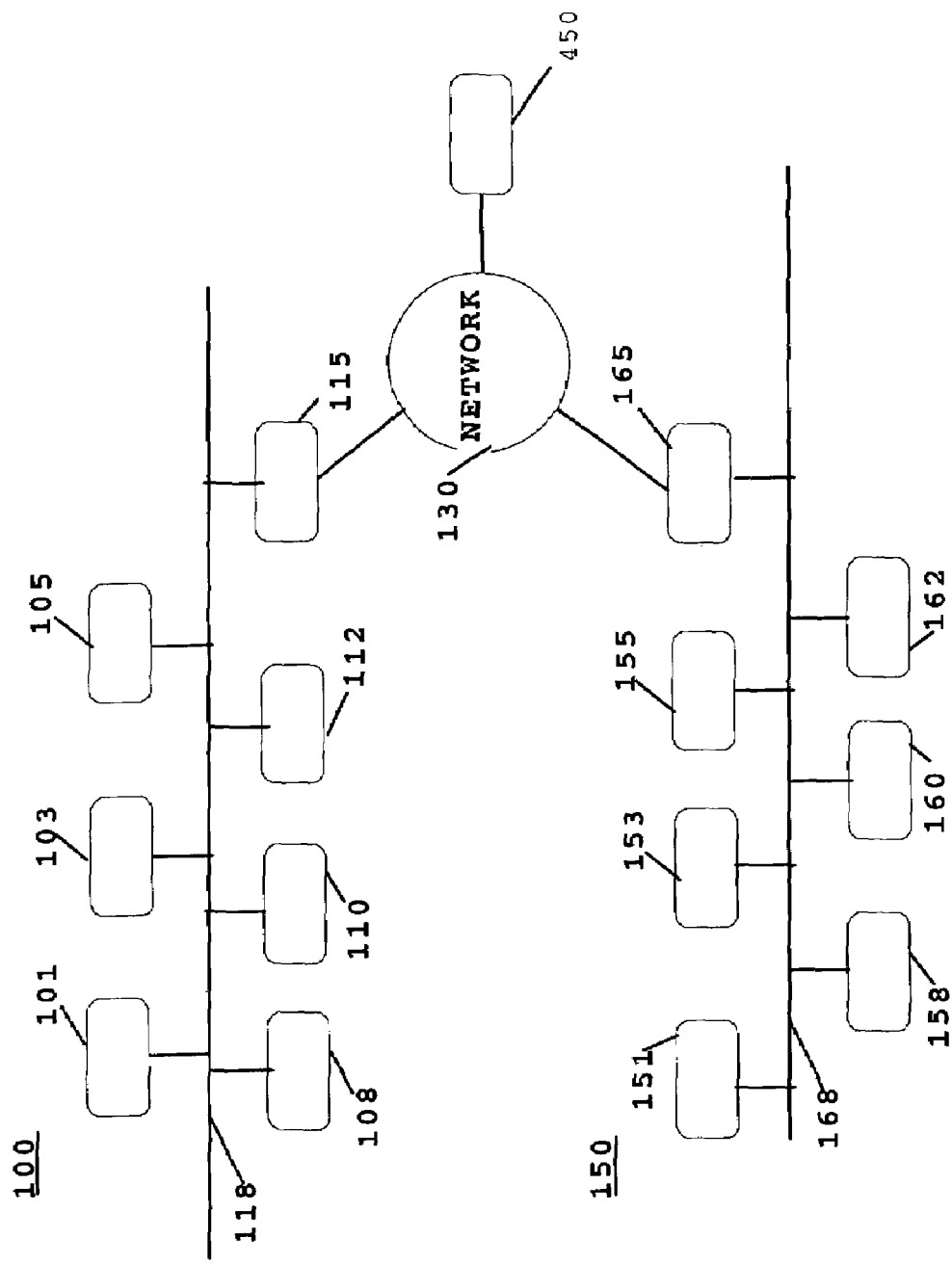
FIG. 1 is a block diagram of a network in which an embodiment of the invention is incorporated.
Figure 2:
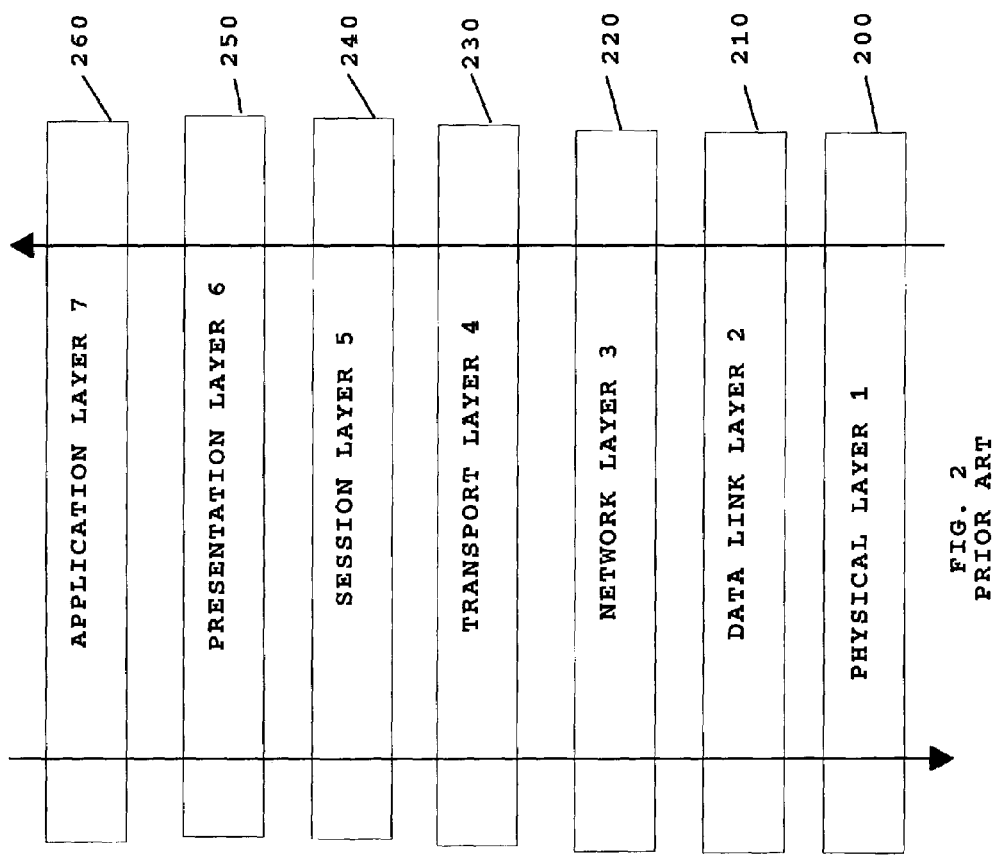
FIG. 2 is a diagram illustrating a conventional OSI (Open Systems Interconnect) model.
Figure 3:
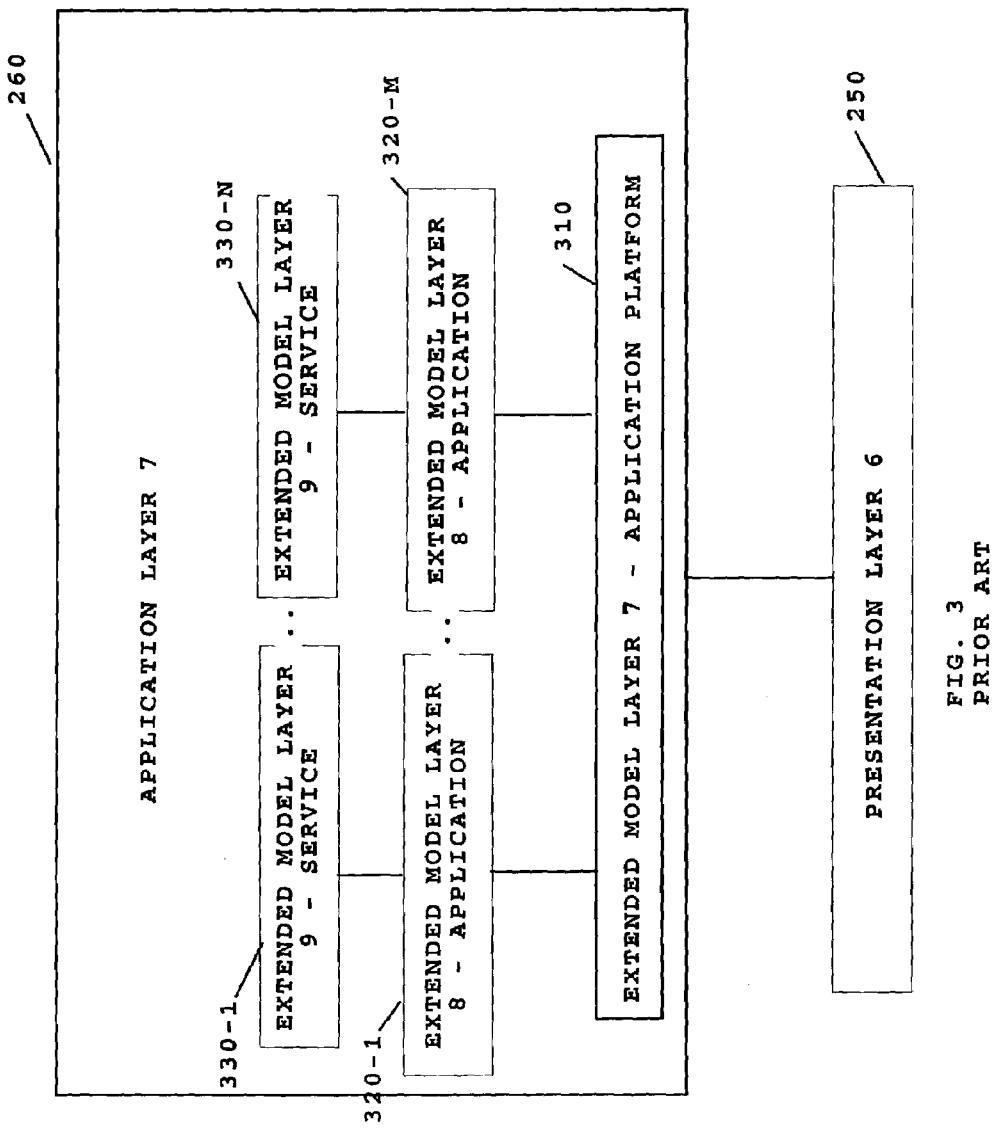
FIG. 3 is a diagram showing an application layer of a an OSI model having an application platform arrangement.
Figure 4:
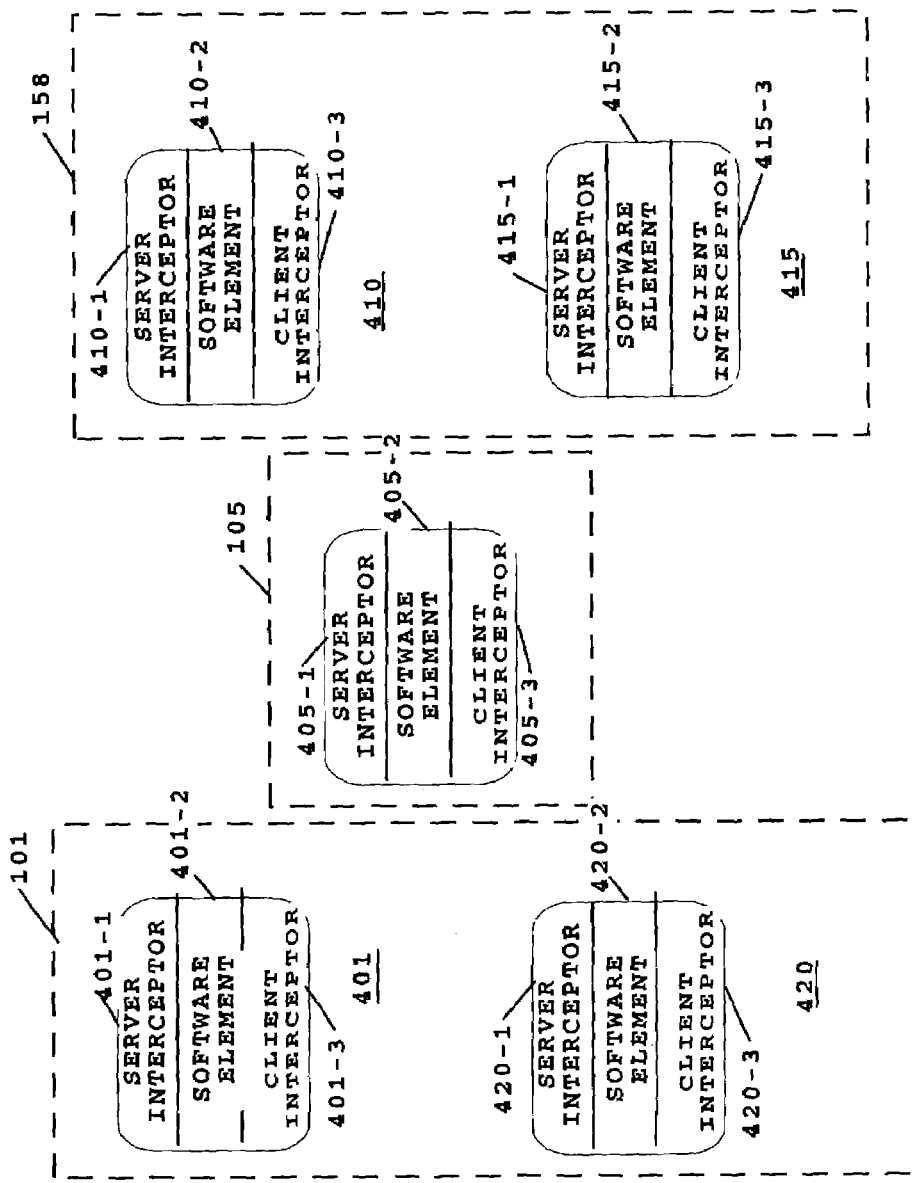
FIG. 4 is a diagram showing an arrangement of software elements in the network of FIG. 1.

FIG. 4 shows an arrangement of service providing software elements of the nodes in the network of FIG. 1. As indicated in FIG. 4, service modules 401 and 420 are part of the node 101 of the network of FIG. 1. Service module 405 is part of the node 105 of FIG. 1 and service modules 410 and 415 are part of the node 158. The service module 401 includes a server interceptor 401-1, a software element 401-2 and a client interceptor 401-3. Similarly, The service module 405 includes a server interceptor 405-1, a software element 405-2 and a client interceptor 405-3. The service module 410 includes a server interceptor 410-1, a software element 410-2 and a client interceptor 410-3. The service module 415 includes a server interceptor 415-1, a software element 415-2 and a client interceptor 415-3 and the service module 420 includes a server interceptor 420-1, a software element 420-2 and a client interceptor 420-3.

At each service module, the software element performs an assigned portion of network processing, a server interceptor selectively coupled to the software element at an input isolation boundary of the software element intercepts information of control flow inbound to the software element and a client interceptor selectively coupled to the software element at an output isolation boundary of the software element intercepts information of control flow outbound from the software element. The server and client interceptors are inserted into the control flow of the software element in response to an examine command from an administrative node 450 shown in FIG. 1. For example, node 105 includes the software element 405-2 that is located in the application level of the node which software element operates in cooperation with processing devices of the node to perform a programmed service. Server and client interceptors 405-1 and 405-3 are separate from the software element and are inserted at isolation boundaries of the software element 405-2. Similarly, node 101 has the software elements 401-2 and 420-2 in the application platform level, which perform different predetermined services using the processing devices of the node 101. Server and client interceptors 401-1 and 401-3 are inserted at respective isolation boundaries of the software element 401-2 and server and client interceptors 420-1 and 420-3 are inserted at the respective isolation boundaries of the software element 420-2. Service modules 410 and 415 are structured similarly in the node 158.

The interceptors of FIG. 4 are inserted into the flow-of-control between interacting software elements at the isolation boundaries between the software elements in response to a command from the administrative node 450 in order to examine the software element operations. Upon the administration node command, one or more interceptors are inserted into the flow-of-control of the interaction prior to its completion when a software element attempts to interact with another software element. The operations of the software element are unaffected by the interceptor insertions. While inserted into the flow-of-control, the interceptors operate to intercept and record information such as response time and error states of the interaction from the information flowing therethrough to examine the operability of the interacting software elements. The interceptor may log information such as the initiating software element and the receiving software elements of the interaction, the communication port associated with the interaction, the time of occurrence of the interaction, a unique identifier of the interaction, a sequence number of the interaction, a logical thread associated with the interaction and records of the interaction. In addition, the interceptor may change data or insert new data (e.g., a unique identifier in the interaction header data) associated with the interaction. The information obtained from the different software element interactions in performing a network task can then be combined to determine the interrelationships of the software elements of the network, serve as a network discovery base, determine errors in the software elements and examine and evaluate the operability of the software elements.

Figure 5:
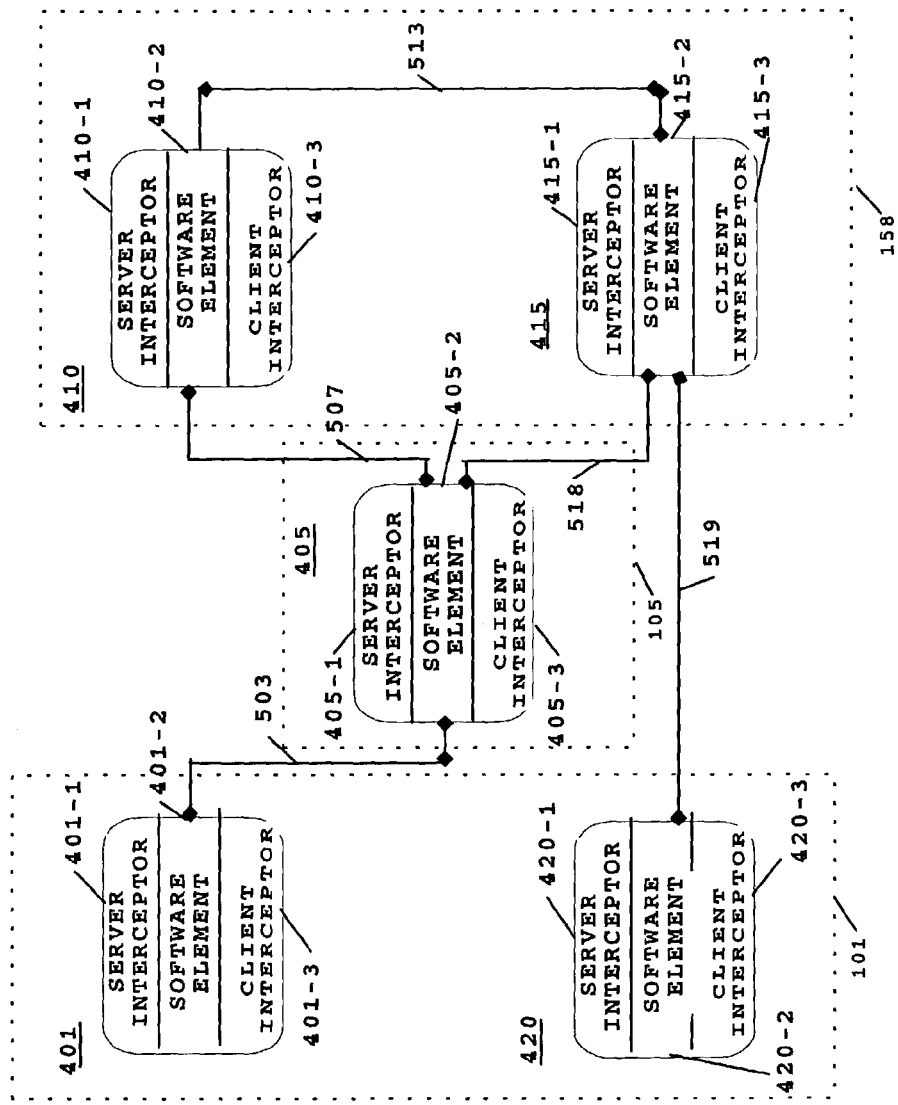
FIG. 5 is a diagram illustrating interactions of plural software elements of the network of FIG. 1 operating without interception of information at the software elements in accordance with an embodiment of the invention.

FIG. 5 shows the logical coupling among the software elements of the service modules 401, 405, 410, 415 and 420 in performing sequential operations of a network task without any interception of software element interactions. In an exemplary network task illustrated in FIG. 5, software element 401-2 in node 101 initiates the task by performing the initial processing operation and then interacts with software element 405-2 in node 105 by sending its output to software element 405-2 through a logical path 503 (i.e., the bus 118 in FIG. 1). The software element 405-2 operates to process the information received from software element 401-2 and interacts with the software element 415-2 by sending its output information to the software element 415-2 through a logical path 518 (bus 118, router 165, network coupler 130, router 115 and bus 168). After the software element 415-2 processes the information received from software element 405-2, the software element 415-2 returns a reply to the software element 405-2.

The software element 405-2 in the node 105 at a later time interacts with the software element 410-2 in the node 158 by sending its output information to the software element 410-2 through a logical path 507 (i.e., the bus 118, the router 115, the network coupler 130, the router 165 and the bus 168). After performing its operation on the information from software element 405-2, the software element 410-2 interacts with the software element 415-2 in the same node 158 by sending its output information to the software element 415-2 through an internal coupling path 513 (i.e., within the node 158). The software element 415-2 in the node 158 operates on the information sent by the software element 410-2 and sends its output to the software element 420-2 in the node 101 for additional processing through the coupling 519 (i.e., the bus 168, the router 165, the network coupler 130, the router 15 and the bus 118). The information from the software element 415-2 in node 158 is then processed in the software element 420-2 of the node 101. The information output from the software element 420-2 is then returned to the software element 401-2 by successive replies and intermediate processing in the software elements 415-2, 410-2 and 405-2.

Figure 6:
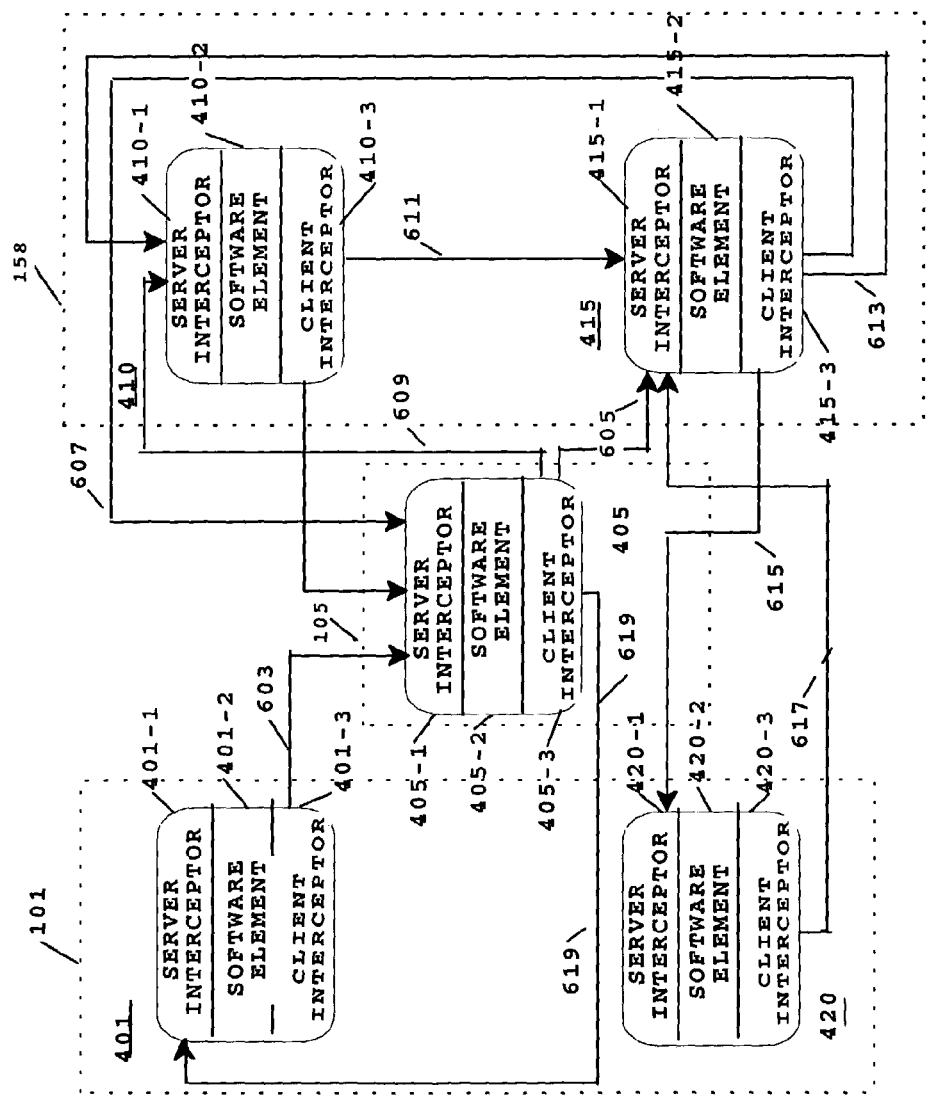
FIG. 6 is a diagram illustrating interactions of plural software elements of the network of FIG. 1 operating with interception of incoming and outgoing information of the software elements in accordance with an embodiment of the invention.

FIGS. 6 and 7 illustrate the operation of the network of FIG. 1 in which server and client interceptors are inserted into the flow control of the software elements of the service modules 401, 405, 410, 415 and 420 in order to intercept the interactions among these software elements, record flow-of-control information and examine software element operability. In FIG. 6, each software element has a server interceptor insertable at the incoming isolation boundary of the software element and a client interceptor inserted at the outgoing isolation boundary of the software element. When operating in the examine mode, the server interceptor 401-1 is inserted at the incoming isolation boundary of software element 401-2 and the client interceptor 401-3 is inserted at the outgoing isolation boundary of the software element 401-2. Software elements 405-2, 410-2, 415-2 and 420-2 also have similar arrangements of server and client interceptors. The inserted interceptors operate to intercept data flow into or out of the software element and to form a record of information pertinent to the operation of the interaction of software element with other software elements engaged in processing a network task. The formed records from the interceptors are stored in the respective software elements and are sent to the administrative node 450 at its request. In the administrative node 450, a system administrator controls the operation of the administrative node in correlating and analyzing the interceptor records from the software elements.

Figure 7A:
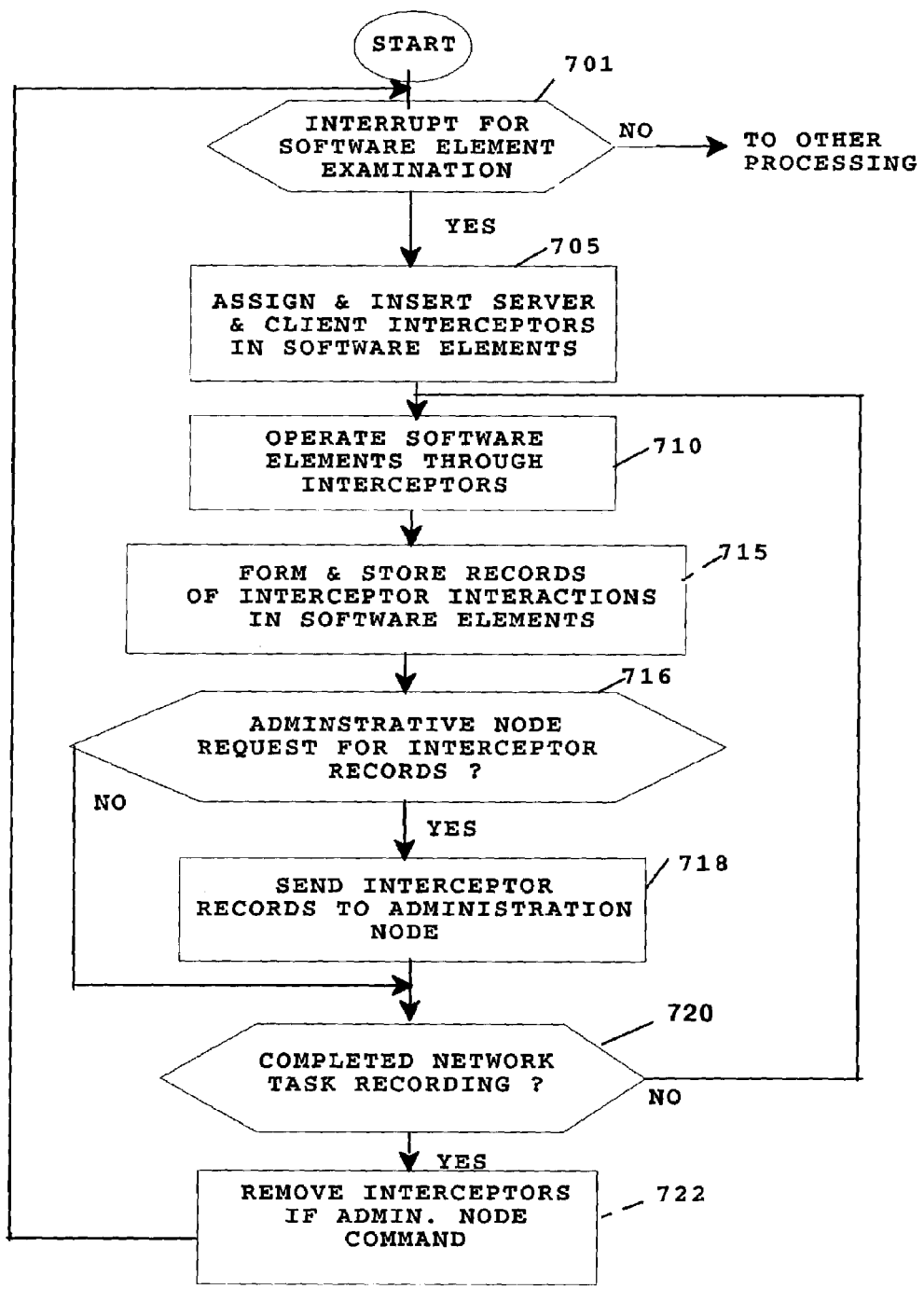
FIG. 7A is a flow chart showing the general operation of the software elements of FIGS. 5 and 6 and an administrative node in accordance with the embodiment of the invention.

Referring to FIG. 7A, an interrupt to examine software elements may be entered by an examine command at the administrative node 450 to start an interaction examination for a network task in a decision step 701. The examine mode at a particular node may also be entered by installing an interceptor software package and left by uninstalling the interceptor software package. If no in the step 701, other network processing is continued. If yes, a step 705 is entered in which server and/or client interceptors are assigned and inserted in the control flow among selected software elements. Selection of software elements for examination is made by the administrative node 450 and may be performed by reference to a network directory in environments using an architecture such as CORBA (Common Object Request Broker Architecture) or Microsoft COM. Using CORBA, the selected software elements for examination are located in the directory and the directory entry for each selected software element is changed so that it refers to the associated interceptors rather than the software element. Alternatively, in environments using services such as XML and SOAP Web, configuration documents that describe software elements are used to locate software elements that interact in a network task. Upon locating the software elements, the configuration documents are changed to refer to the interceptors associated with the assigned software elements.

In some environments (e.g., Microsoft Net), frameworks on which services are built support plug-in or replacement elements in a protocol stack. In OSI stacks, the plug-ins or replacement elements are typically used to implement some of the different OSI layers. An interceptor may be installed as a virtual layer in the protocol stack so that the protocol stack is extended and all interactions pass through the interceptor. Alternatively, the entire set of elements in the protocol stack can be replaced by an interceptor that then delegates to the original set of elements in the protocol stack after completing the interceptor task. The set of elements in the protocol stack may be defined through configuration information or through start-up time software configuring independently of the software elements. In other environments such as Java RMI or OSF DCE, the core facilities for communication between software elements are implemented, themselves, through an isolation mechanism (e.g., Java classes for Java RMI or predefined C language APIs for DCE). In these environments, an interceptor can define an identically named subset of classes and/or APIs that are given, as part of the platform configuration, higher precedence for loading. For example, the interceptor may be put earlier as a framework replacement in the CLSSPATH for Java or in the LIBPATH for UNIX. When the platform attempts to load these classes and/or APIs, the interceptor version is loaded instead. When these classes and/or APIs are invoked as part of an interaction, the interceptor will perform its work and then delegate to the original class and/or API so that the software element can perform its original work. With the described protocol stack extension and framework replacement, both server and client interceptors may be coupled to software elements.

In the example illustrated in FIG. 6 which uses the protocol stack extension or framework replacement arrangements, protocol stacks or frameworks for the software element 401-2 are changed to include the server interceptor 401-1 and the client interceptor 401-3 so that information flow into the software element 401-2 passes through the server interceptor 401-1 and the information flow out of the software element 401-2 passes through the client interceptor 401-3. Since the software element 401-2 is isolated from its server and client interceptors, the processing in the software element 401-2 is unaffected by the insertions. Similarly, server and client interceptors are inserted in the control flow of software elements 405-2, 410-2, 415-2 and 420-2 as shown in FIG. 6. In a discovery task, an examine command operates to insert interceptors at all known software elements.

After the server and client interceptors are inserted at the selected software elements in a step 705 of FIG. 7A, the loop including steps 710, 715, 716, 718 and 720 is entered. In the step 710, the software elements are operated through their server and client interceptors so that information of interactions among the software elements may be logged. Such information may include data of the interaction, response time, time of occurrence of the interaction, error states, communication ports and sequence position associated with the interaction. During the operation with the interceptors inserted, one or more records are formed of the information logged by each server interceptor and each client interceptor invoked during its interactions in a step 715. The logged information of the interceptors is stored as interceptor records in the associated software element. In a step 716, it is decided whether there is an administrative node request for interception records. If yes, the formed interceptor record or records are sent from the software elements being examined to the network administration node 450 (step 718) wherein they are stored in the administrative node database. Control is passed from the step 716 or the step 718 to the decision step 720. Until the administrative node sends a command to complete network task recording through steps 720 and 722, the loop from the step 710 to the step 720 is reentered for the software elements to continue the operation of the network task with interceptors inserted. Upon a completion command from the administrative node 450, the interceptors may be removed from the software elements by administrative node command in the step 722.

Figure 7B:
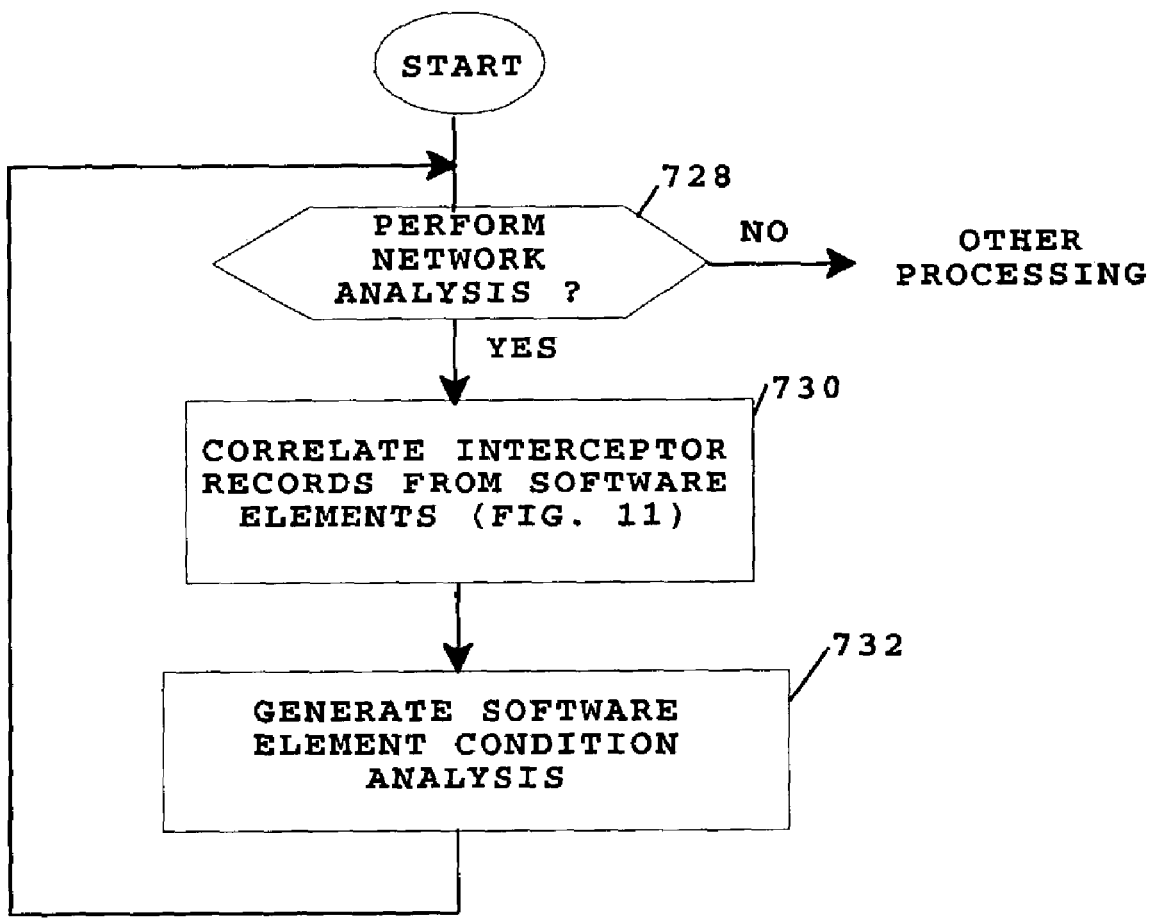
FIG. 7B is a flow chart showing the operation of the administrative node in performing network analysis in accordance with an embodiment of the invention.

An analysis of the network tasks is performed in the administrative node in response to an analysis command from the network administrator. As shown in FIG. 7B, an analysis command of the administrative node in a perform network analysis decision step 728 starts a software element condition analysis by correlating the records received from the interceptors in a step 730. A software element condition analysis is then performed in a step 732. In one type of analysis by a system administrator, the interrelationships of the software elements are determined for use of the network administrator. In another type of analysis, the operability of the software elements in performing a particular network task is examined and in yet another type of analysis, software elements causing faulty operation are identified.

Figure 8:
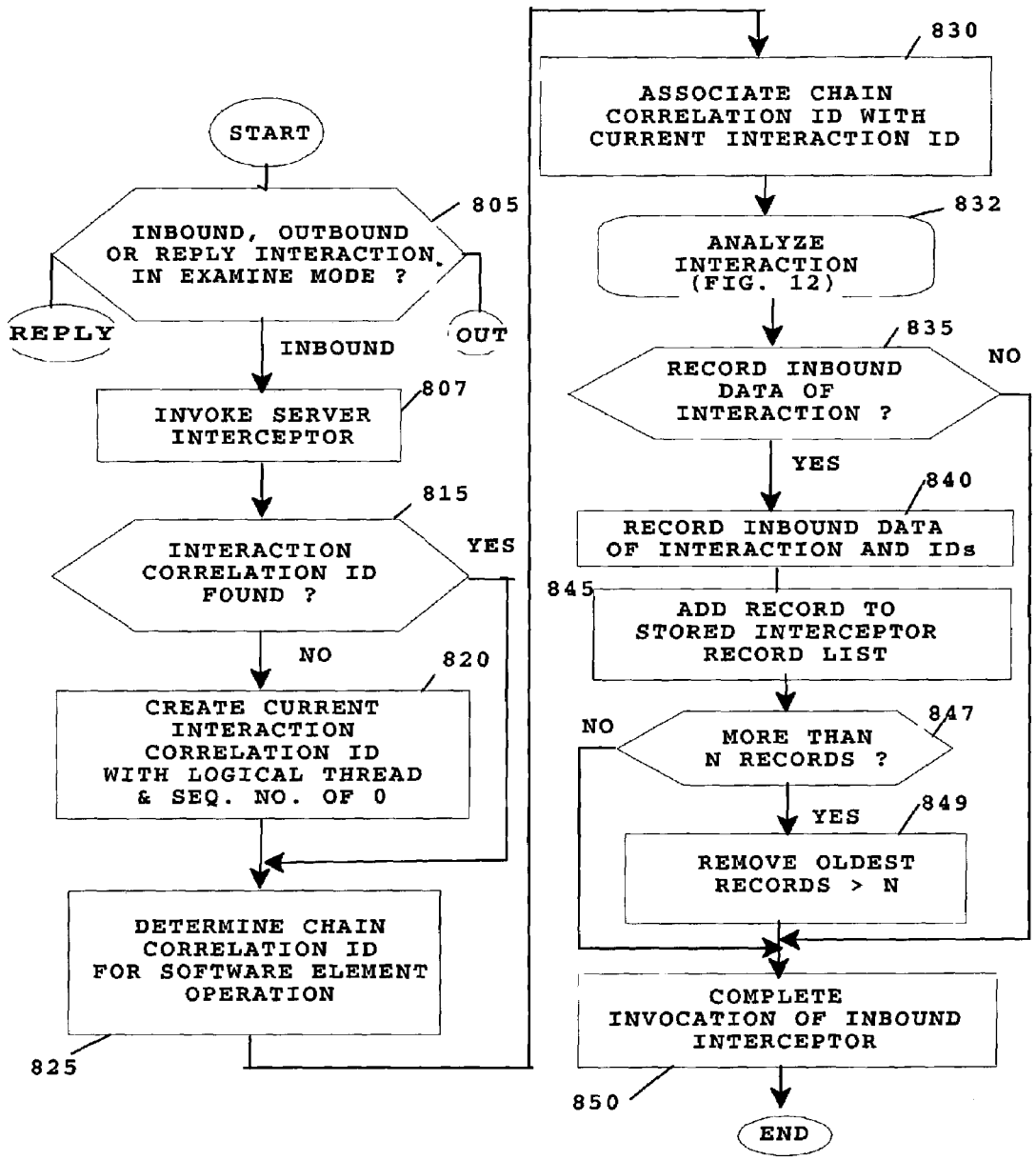
FIG. 8 is a flow chart illustrating the operation of a server interceptor the receives requests and sends replies in accordance with the embodiment of the invention.
Figure 9:
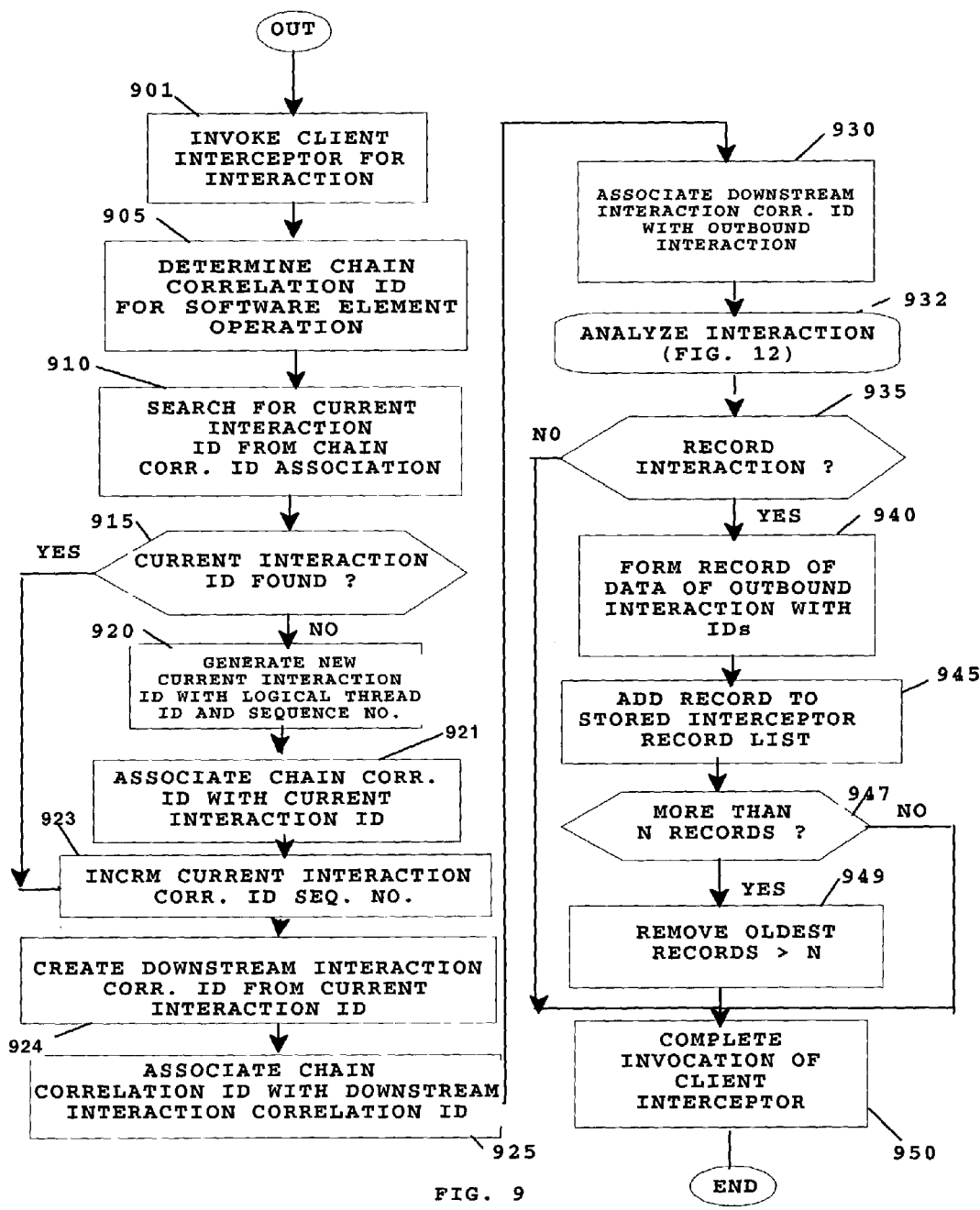
FIG. 9 is a flow chart that illustrates the operation of a client interceptor that sends requests and receives replies in accordance with the embodiment of the invention.
Figure 10:
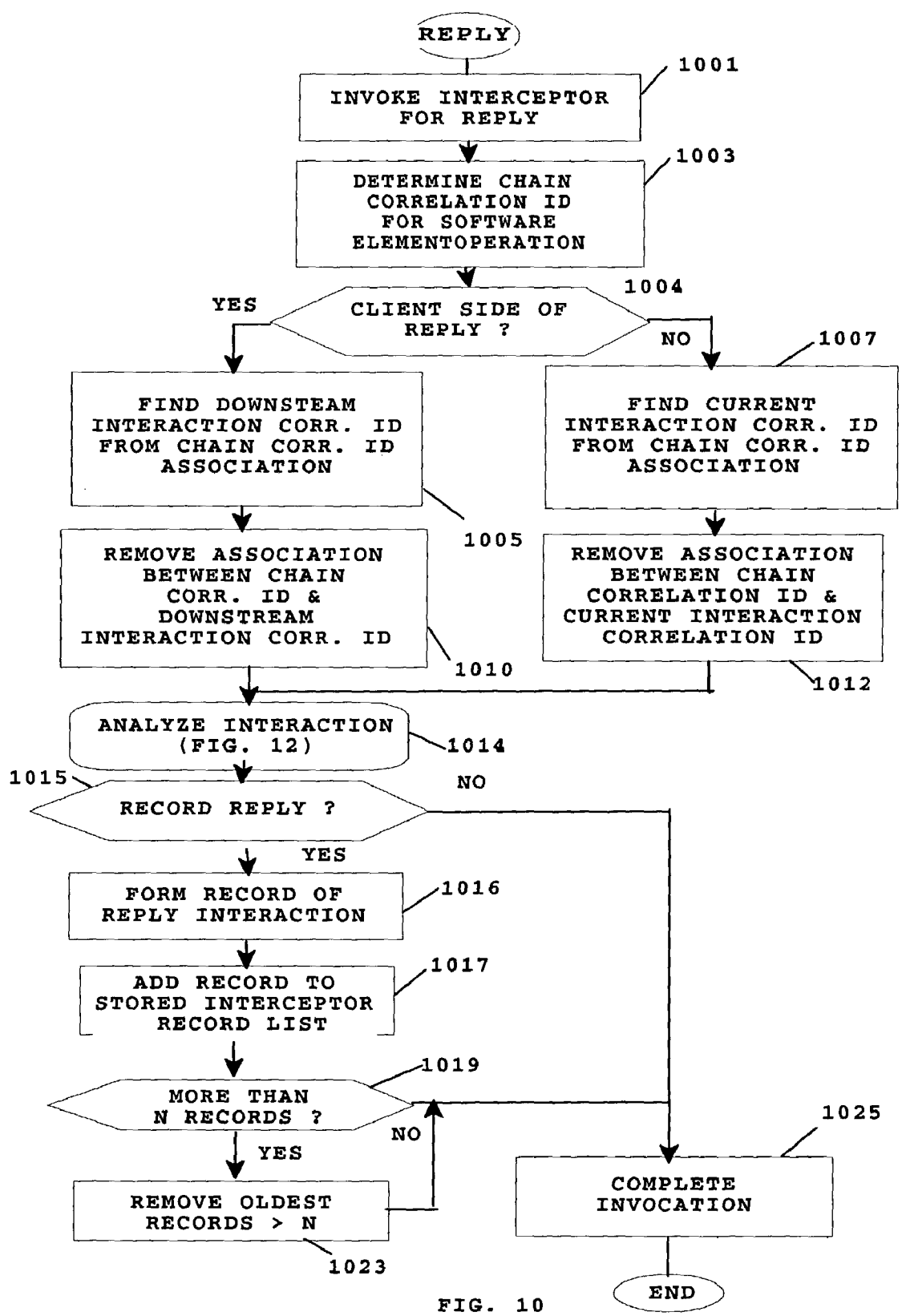
FIG. 10 is a flow chart illustrating a reply operation of the interceptors in accordance with the embodiment of the invention.
Figure 16:
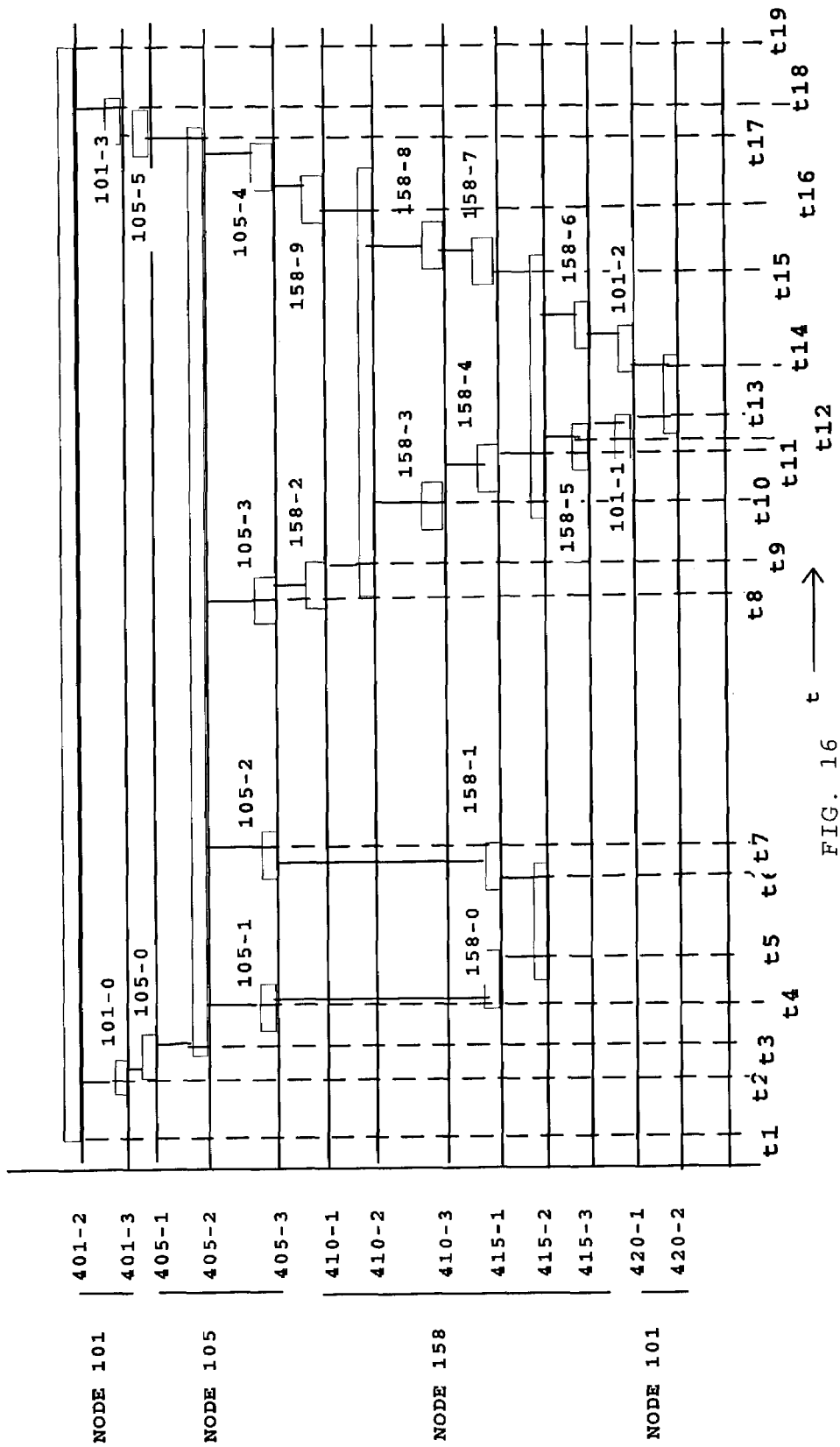
FIG. 16 is a graphical representation of an exemplary sequence of operations of the software elements in accordance with the embodiment of the invention.

The operations of the interceptors in the steps 710, 715, 716 and 718 for the intercepted interactions of each software element are illustrated in greater detail in FIGS. 8, 9 and 10 with reference to the software element arrangement of FIG. 6. In the arrangement of FIG. 6, server and client interceptors are inserted in the software elements 401-2, 405-2, 410, 2, 415-2 and 420-2. A timing diagram of an exemplary network task to be performed in accordance with the invention is shown in FIG. 16. The software element 401-2 operates between times t1 and t19 in FIG. 16. After initiating the network task at t1, the software element 401-2 requests information processing of the software element 405-2 at a time t2 by sending a client request through its client interceptor 401-3 to the server interceptor 405-1 of the software element 405-2 via a logical path 603 (i.e., the bus 118) so that the software element 405-2 starts its information processing at time t3. The operations of the client interceptor 401-3 occur at a relative node time 101-0 at the node 101 and the operations of the server interceptor occur at a relative node time 105-0. Referring to the flow chart of FIG. 8 with respect to the operations of the client interceptor 401-3 and the server interceptor 405-1, a step 805 is entered when the network task is in the examine mode and an outbound interaction of software element 401-2 is detected by its client interceptor 401-3. The detected outbound interaction transfers control from the step 805 to a step is 901 in FIG. 9. In the step 901 the client interceptor 401-3 previously inserted at the outgoing isolation point of the software element 401-2 is invoked.

In order to analyze interceptor records, it is necessary to identify the chain of the software elements in which the network task is performed and also to identify each of the interactions in the chain. The interactions may be one-to-one or there may be multiple interactions between one software element and several others or among plural software elements. In some networks, the control flow may be used to identify the chain of interactions using the thread of control to correlate received interactions with any interactions initiated while serving the received interaction. The interactions of a transaction-oriented system may be identified by a transaction identifier according to inheritance by downstream interactions of their upstream interaction's transaction wherein downstream interactions are at least initiated before its upstream interaction being performed is completed. As a result, a unique transaction identifier may be formed for the interactions of the transaction so that the transaction scope of the interactions may be used to correlate a received interaction with any interactions initiated while the received interaction is served.

In other network arrangements, sessions involving multiple interactions may be identified and a unique session identifier can be used to correlate a received interaction with an initiated interaction. In the interceptor arrangement of FIG. 6, chain correlation and interaction correlation identifications are determined and inserted in the records of the interactions for correlation of the records at the administrative node together with the order of occurrence of the interactions. Chain correlation identifications relate incoming-to-server interceptor interactions and outgoing-from-client interceptor interactions of a software element participating in the network task and the interaction correlation identifications relate the outbound interactions of one software element to the inbound interactions of a different software element in the network task. These identifications are recorded in the server and client interceptors of the network task software elements.

Referring to FIG. 9, a step 905 is entered from the client invocation step 901 and a chain correlation identification C-0 is determined for this processing operation of the software element 401-2 in the network task is set. Then in a step 910, a search is conducted for a current interaction correlation identification that may have been set for the interaction of the software element 401-2. No interaction correlation identification is found in a step 915 for software element 401-2 since the interaction has been initiated in this software element at a time t2 in FIG. 16. A step 920 is then entered from the decision step 915 and a new current interaction correlation identification I-10 is set in the client interceptor 401-3 using a new logical thread identification LT-100 for the network task and a sequence number set to −1. The current interaction correlation identification I-10 is then associated with the chain correlation identification C-0 for software element 401-2 in a step 921. The sequence number is incremented to 0 in a step 923 and a downstream interaction correlation identification is created from the current interaction identification in a step 924. Since the network task was initiated in the software element 401-2, the downstream interaction correlation identification is set to the current interaction correlation identification I-10. The chain correlation identification C-0 is then associated with the downstream interaction correlation identification I-10 in a step 925 and control is passed to a step 930. If an interaction correlation identification was found in the search of the step 910, the sequence number of the current interaction correlation identification is incremented in the step 923 that indicates a client request has been made. A downstream interaction correlation identification is created from the current interaction identification in a step 924 and the downstream interaction correlation is associated with the chain correlation identification in the step 925. Control is then passed to the step 930 in which step the downstream interaction correlation identification is associated with the outbound interaction from the software elements 401-2 to the software element 405-2 by the client interceptor 401-3 to allow a server interceptor at the downstream software element to find the identical interaction correlation identifier for later correlation. In performing this function, the client interceptor may insert the interaction correlation identifier into the data of the outbound interaction from the software element 401-2. Alternatively, an inherent property of the communication channel over which the interaction will be sent such as the port number of the communication channel together with a sequence number indicating the order of data sent through the communication channel may be used or another inherent property of the interaction, e.g., a transaction identifier and a corresponding sequence number, may be used as the interaction correlation identifier.

Figure 12:
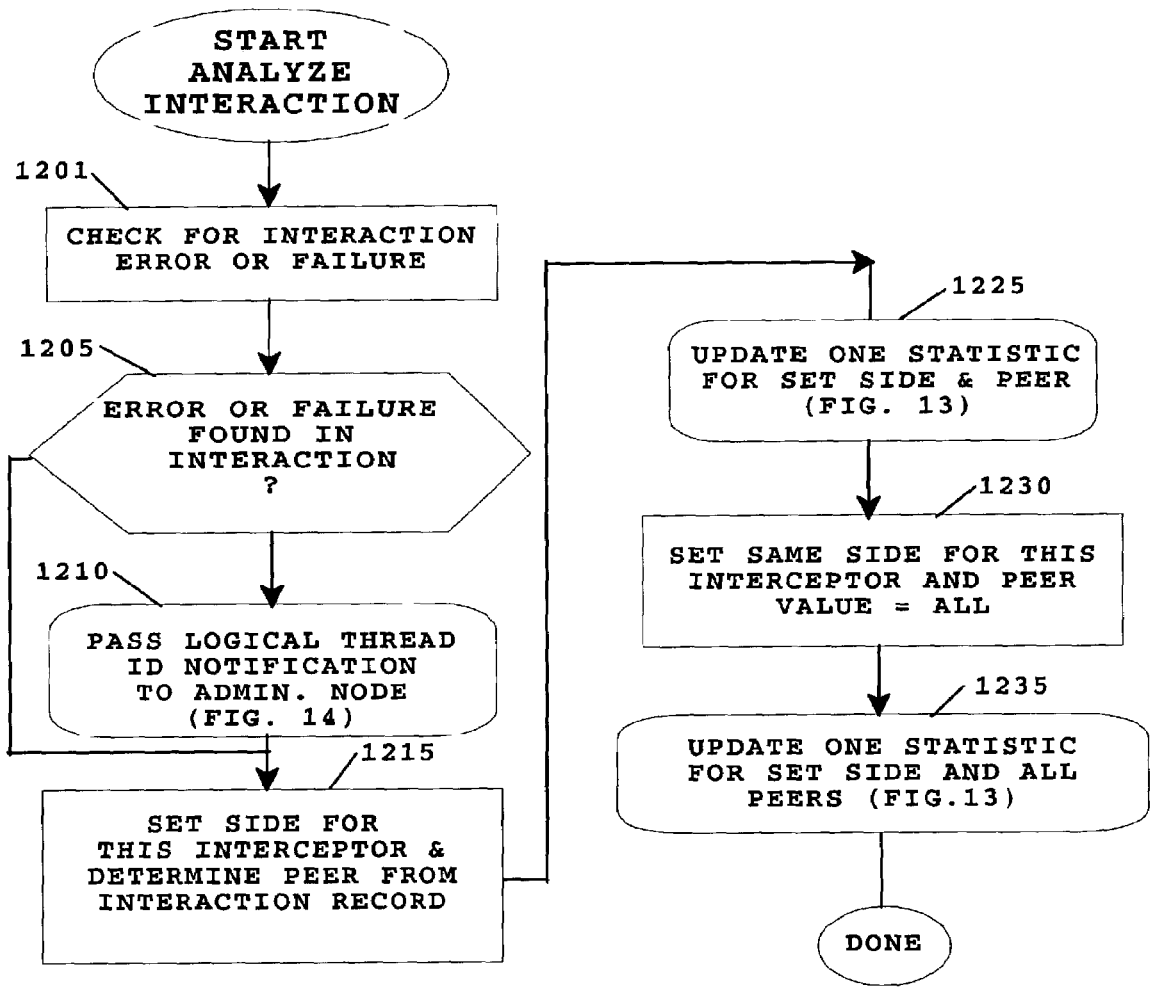
FIG. 12 is a flow chart showing the aggregate statistics forming operations of the interceptors in accordance with the embodiment of the invention.
Figure 14:
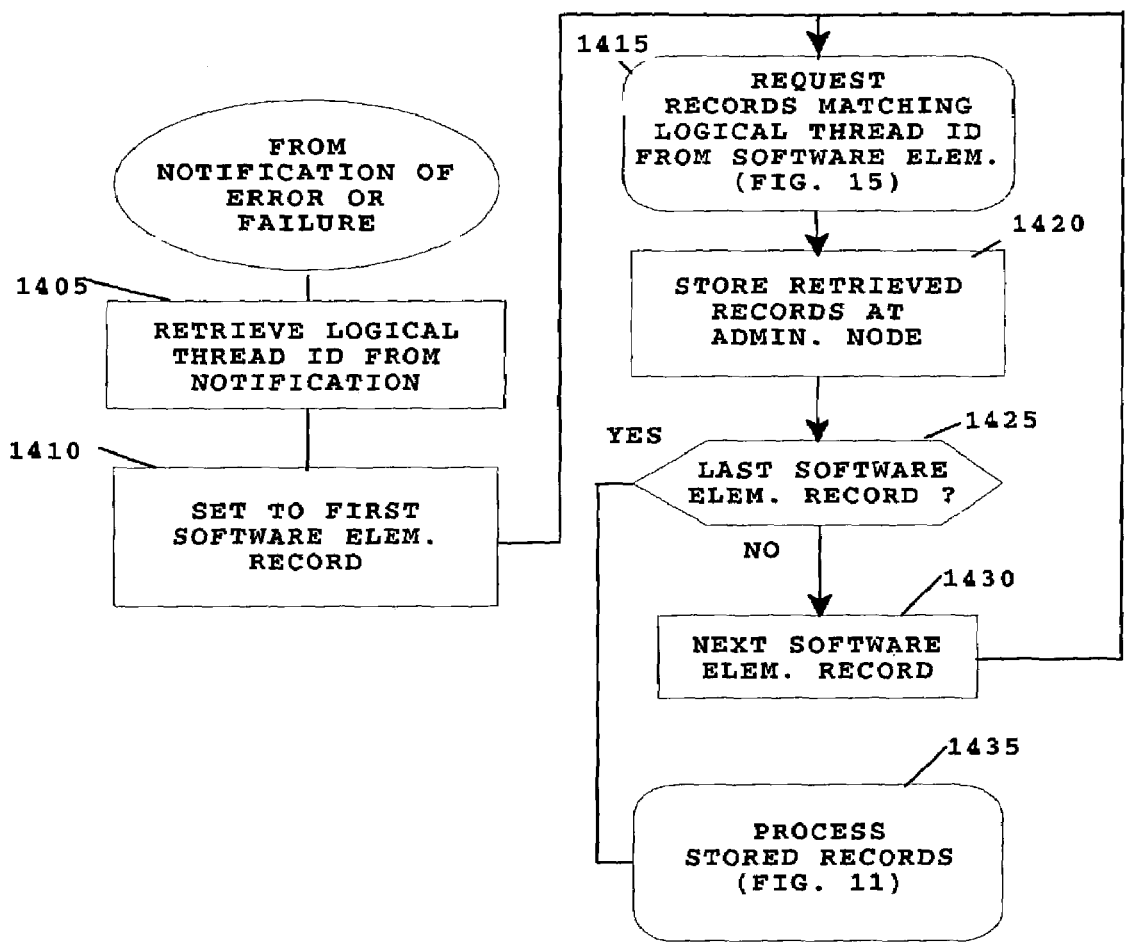
FIG. 14 is a flow chart showing the operation of the administrative node upon notification of an error or failure in an interceptor.

FIG. 9, the step 932 is entered in which the interaction is analyzed according to routine of the flow chart of FIG. 12. Referring to FIG. 12, a check for interaction error or failure is made in a step 1201. If error or failure is detected, the administrative node is notified of the logical thread identification of the interaction with an error or failure in a step 1210 and control is transferred to a step 1405 in the flow chart of FIG. 14. In the step 1405 of FIG. 14, the logical thread identifier LT-100 which identifies the network task in which the error or failure occurred is retrieved from the software element notification (step 1405) and the first software element record is addressed (step 1410). The loop from a step 1415 to a step 1430 is entered. In the step 1415, the interceptor records of an addressed software element are retrieved according to the flow chart of FIG. 15.

Figure 15:
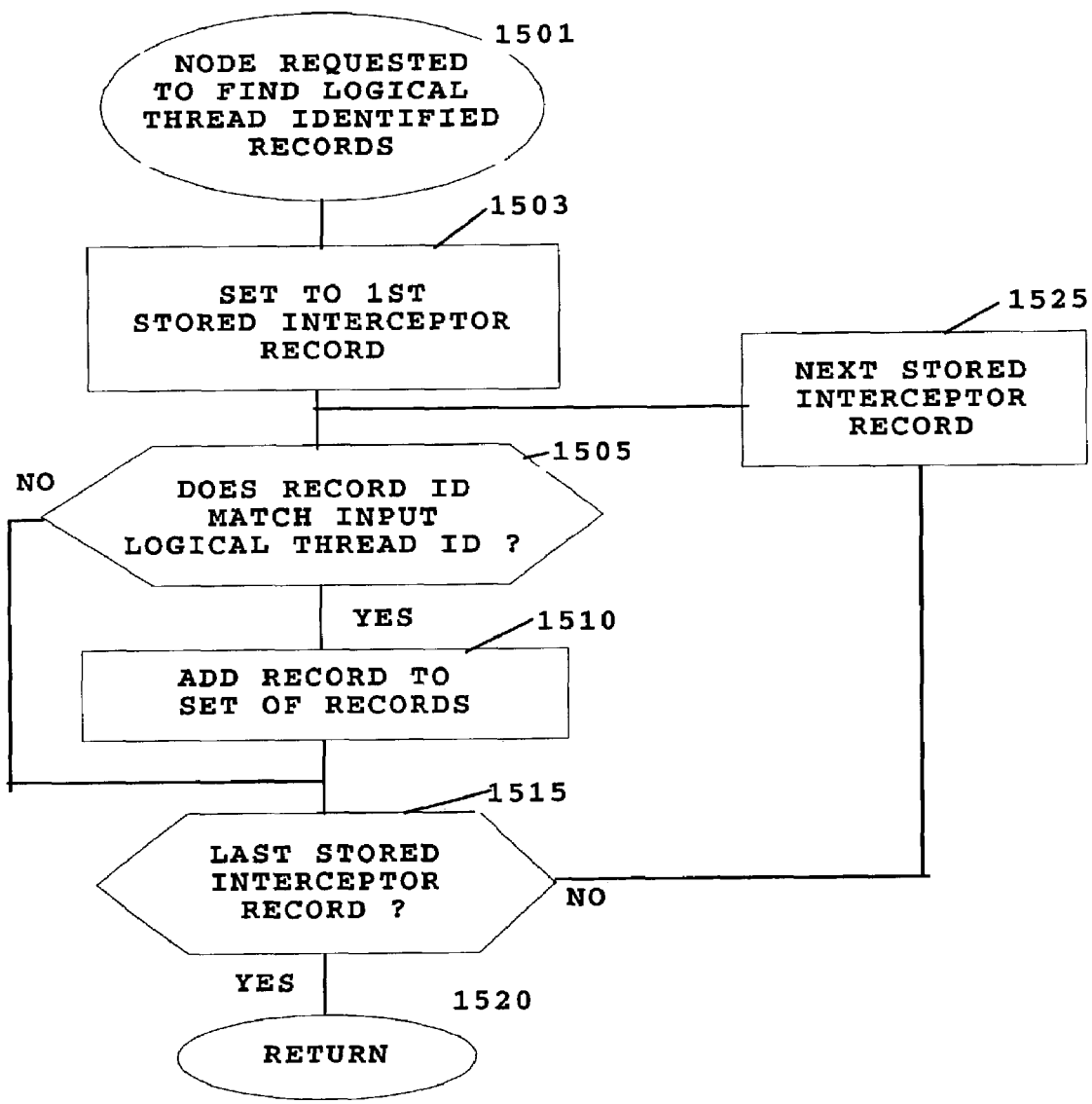
FIG. 15 is a flow chart showing the operation in a software element requested by the administrative node upon error or failure.

Referring to the flow chart of FIG. 15, the first stored interceptor record of the addressed software element is addressed in a step 1503. If the identifier in the interceptor

TABLE 1

| INTER ACTION | INTRCPTR | NODE | TIME | SW ELEM | Side | Direction | INTER ID | INT. ID CREATED | Chain ID | SEQ. NO. |
|---|---|---|---|---|---|---|---|---|---|---|
| FIRST | 401-3 | 101 | 101-0 | 401-2 | Client | Request | I-10 | yes | C-0 | 0 |
|  | 405-1 | 105 | 105-0 | 405-2 | Server | Request | I-10 |  | C-1 |  |
| SECND | 405-3 | 105 | 105-1 | 405-2 | Client | Request | I-11 | yes | C-1 | 1 |
|  | 415-1 | 158 | 158-0 | 415-2 | Server | Request | I-11 |  | C-2 |  |
|  | 415-1 | 158 | 158-1 | 415-2 | Server | Reply | I-11 |  | C-2 |  |
|  | 405-3 | 105 | 105-2 | 405-2 | Client | Reply | I-11 |  | C-1 |  |
| THIRD | 405-3 | 105 | 105-3 | 405-2 | Client | Request | I-12 | yes | C-1 | 2 |
|  | 410-1 | 158 | 158-2 | 410-2 | Server | Request | I-12 |  | C-3 |  |
| FOURTH | 410-3 | 158 | 158-3 | 410-2 | Client | Request | I-13 | yes | C-3 | 3 |
|  | 415-1 | 158 | 158-4 | 415-2 | Server | Request | I-13 |  | C-4 |  |
| FIFTH | 415-3 | 158 | 158-5 | 415-2 | Client | Request | I-14 | yes | C-4 | 4 |
|  | 420-1 | 101 | 101-1 | 420-2 | Server | Request | I-14 |  | C-5 |  |
|  | 420-1 | 101 | 101-2 | 420-2 | Server | Reply | I-14 |  | C-5 |  |
|  | 415-3 | 158 | 158-6 | 415-2 | Client | Reply | I-14 |  | C-4 |  |
| FOURTH | 415-1 | 158 | 158-7 | 415-2 | Server | Reply | I-13 |  | C-4 |  |
|  | 410-3 | 158 | 158-8 | 410-2 | Client | Reply | I-13 |  | C-3 |  |
| THIRD | 410-1 | 158 | 158-9 | 410-2 | Server | Reply | I-12 |  | C-3 |  |
|  | 405-3 | 105 | 105-4 | 405-2 | Client | Reply | I-12 |  | C-1 |  |
| FIRST | 405-1 | 105 | 105-5 | 405-2 | Server | Reply | I-10 |  | C-1 |  |
|  | 401-3 | 101 | 101-3 | 401-2 | Client | Reply | I-10 |  | C-0 |  |

The interaction and chain correlation identifications formed in the interaction operations of the interceptors for the network task of the timing diagram of FIG. 16 are illustrated in Table 1. In Table 1, the interceptors and the nodes of the interactions of the network task are listed along with the relative time of the interaction at the nodes, the associated software element, the interceptor side (client or server) of the interaction, the interaction direction (request or reply), the interaction identification, whether the interaction identification is created in the interaction, the chain correlation identification for the interceptor and the sequence number of the interaction. As noted with respect to the client interceptor 401-3 in the first interaction from the software element 401-2 of the node 101 to software element 405-2 of node 105, the relative time of the client side of the interaction at the node 101 is set to 101-0. The logical thread identification created in the step 920, which remains the same for all the interactions of the network task is LT-100 (not listed) and the sequence number from the increment step 923 is 0. The downstream interaction correlation identification created in the step 924 is I-10 and the chain correlation identification of the client interceptor 401-3 for the current interaction is C-0.

After the association of the downstream interaction identification with the outbound interaction in the step 930 of record matches the logical thread identifier LT-100, the interceptor record is added to a set of interceptor records to be sent to the administrative node (step 1510) and the next stored interceptor record is accessed (step 1525) if the last stored interceptor record has not been not reached (step 1515). Otherwise, the step 1515 is entered directly from the step 1505. In the step 1515, it is decided whether the last interceptor record in the addressed software element has been accessed. Until the last interceptor record of the addressed software element has been processed, the loop from the step 1505 to the step 1525 is reentered to collect all the interceptor records of the network task identified by the logical thread identifier LT-100. After the last interceptor record for the currently addressed software element has processed in FIG. 15, control is passed to the step 1420 of FIG. 14 wherein the retrieved interceptor records of the currently addressed software element are stored in the administrative node 450. Until the last software element is processed in FIG. 14, the loop from the step 1415 to the step 1430 is reentered to obtain the interceptor records of the next addressed software element having the logical thread identifier LT-100. After the interceptor records of the last software element having the logical thread identifier LT-100 is obtained, the stored software element interceptor records are then available for correlation as will be described with respect to the flow chart of FIG. 11.

Figure 13:
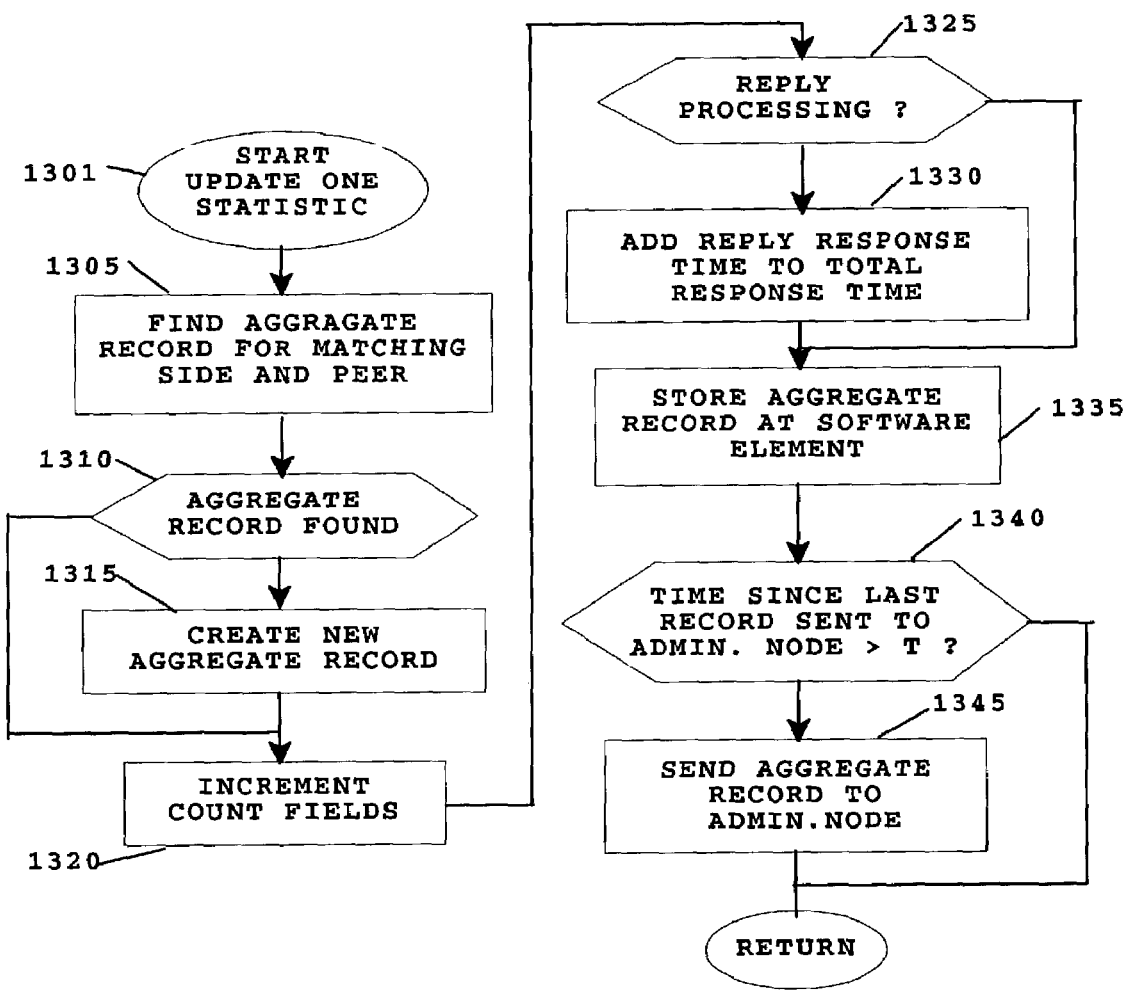
FIG. 13 is a flow chart illustrating the updating of aggregate statistics of the interaction operations of a software element in accordance with the embodiment of the invention.

With or without an error or failure detected in the client side 401-3 of the interaction, the server interceptor 405-1 peer of the interaction is determined from the interaction information at the client interceptor 401-3 in a step 1215 of FIG. 12 and the statistic update routine of a step 1225 is performed as shown in the flow chart of FIG. 13. In FIG. 13, a step 1305 is entered from the step 1215 of FIG. 12 in which a search is made in the software element 401-2 for an aggregate statistics record for the matching client side interceptor 401-3 and the peer server interceptor 405-1. If not found, a new aggregate record is created in a step 1315. The statistics in an aggregate record for a software element may include fields for interaction counts, failure counts, average response time of a software element, average response time of a software element when serving requests from another specific software element, percentage of calls to a specific software element that came from another specified software element and percentage of calls from a specified software element that are sent to another specified software element. The fields are updated in either the found or created aggregate statistics record in a step 1320.

If a reply interaction is processed (step 1325), the reply response time is added to the total response time in the aggregate statistics record (step 1330) and the aggregate statistics record is stored at the software element 401-2 in a step 1335. When a time T has passed since the last aggregate statistics record was sent to the administrative node 450 (step 1340), the aggregate statistics record is sent to the administrative node (step 1345). Whether or not a record is sent to the administrative node 450, control is returned to a step 1230 in FIG. 12 wherein the side is again set for the interceptor 401-3 and all peer interceptors. The statistics are updated for the interceptor 401-3 and all peer interceptors of the network task in the step 1235 using the routine of FIG. 13 and control is returned to FIG. 9 at step 935.

In the step 935 of FIG. 9, it is decided whether information of this interaction generated in the client interceptor 401-3 is to be recorded in the software element 401-2. If not, the invocation of the client server 401-3 is completed in a step 950. If yes, a record of the data of the outbound interaction is made (step 940). The interaction and chain correlation identifications as well as the logical thread identification and sequence number are included in the formed record. The formed interceptor record is added to an interceptor record list stored in the software element 401-2 in a step 945. If there are more than N records stored in the software element 401-2, the oldest records greater than N are removed in a step 949 and the invocation of the client interceptor 401-3 is completed in the step 950. Instead of adding the interceptor records to the list and removing the oldest records, the interceptor record may be sent directly to the administrative node 450.

Referring again to FIG. 8 with regard to the first interaction, the server interceptor 405-1 is invoked in a step 807 and whether an interaction correlation identification from another software element has been received is decided in a step 815. If not, an interaction correlation identification with a logical thread identifier and a sequence number of 0 is created in a step 820. In the interaction between the client interceptor 401-3 and the server interceptor 405-1, the interaction correlation identification I-10 from the client interceptor 401-3 is found as shown in the first interaction of Table 1 in a step 815 and the chain correlation identification for the operation of the software element 405-2 is determined to be C-1 in a step 825. The chain correlation identification is then associated with the interaction correlation identification I-10 sent from the client interceptor 401-3 in a step 830. As indicated for the server interceptor 405-1 side of the request interaction between software elements 401-2 and 405-2 in Table 1, the relative time of the server side of the interaction at the node 105 is 105-0. The logical thread identification remains LT-100 and the sequence number 0 remains unchanged. A step 832 is then entered from the step 830 and the analysis of interaction of the server interceptor 405-1 is performed in the routine shown in FIGS. 13 and 14 in substantially the same manner as described with respect to client interceptor 401-3 with the server side and its peers being set and the updating of an aggregate statistics record for the server side and its peers is performed and stored in the software element 405-2.

After the interaction analysis of the step 832, a step 835 is entered in FIG. 8 wherein it is decided whether a record of the server interaction is to be formed. If not, the invocation of the server interceptor 405-1 is completed in the step 850. If yes, a record of the interaction information is made (step 840) with the interaction and client correlation identifications as well as the logical thread identification and sequence number included in the formed record. The interceptor record is added to an interceptor record list stored in the software element 405-2 in a step 845. If there are more than N records stored in the software element 405-2 in a step 847, the oldest records greater than N are removed in a step 849 and the invocation of the server interceptor 405-1 is completed in a step 850. Instead of adding the interceptor records to the list and removing the oldest records, the interceptor record may be sent directly to the administrative node 450.

The first interaction for the request by the software element 401-2 of the software element 405-2 is completed at a time t3 in FIG. 16 and the software element 405-2 starts processing information for the client request of the software element 401-2. At a time t4 during the processing in the software element 405-2 at the node 105, a second interaction is started with a request of the software element 405-2 of the node 105 to the software element 415-2 at the node 158 for information processing through the client interceptor 405-3 and the server interceptor 415-1 over the logical path 605 (i.e., the bus 118, the router 115, the network 130, the router 165 and the bus 168). At the software element 405-2, the client interceptor 405-3 is invoked in the step 901 at a node time of 105-1. As shown for the client side of the second request interaction in table 1, the chain correlation identification for the software element 405-2 remains C-1. Since the chain correlation identification C-1 was associated with the current interaction correlation identification I-10 in the first interaction of table 1, the sequence number is incremented from 0 to 1 in the step 923; a downstream interaction correlation identification I-11 is created from the current interaction correlation identification I-10 in the step 924; and the downstream interaction correlation identification I-11 is associated with the outbound interaction in the step 930. Using the information for the client side of the second interaction (table 1), the step 932 is entered and the interaction analysis and updating of statistics subroutines of the flow charts of FIGS. 12 and 13 are performed for the client interceptor 405-3 side and peers of the second interaction as discussed with respect to the first interaction. It is then decided in the step 935 whether the interaction is to be recorded. If yes, a record of the information of the outbound interaction is made (step 940). The interaction and client correlation identifications as well as the logical thread identification and sequence number are included in the formed record. The interceptor record is added to an interceptor record list stored in the software element 405-2 in a step 945. If there are more than N records stored in the software element 405-2, the oldest records greater than N are removed in a step 949 and the invocation of the client interceptor 405-3 is completed. Instead of adding the interceptor records to the list and removing the oldest records, the interceptor record may be sent directly to the administrative node 450. If no in the step 935, the interaction invocation of the client interceptor 405-3 is completed in the step 950.

At the server side of the second interaction request between software elements 405-2 and 415-2, the server interceptor 415-1 operates according to the flow chart of FIG. 8 at the node time158-0. The step 807 is entered in which the server interceptor 415-1 is invoked. The downstream interaction correlation identification I-11 is found in the step 815 so that the chain correlation for the software element 415-2 C-2 is determined (step 825) and associated with the downstream interaction correlation identification I-11 in the step 830. The interaction is analyzed for the server side interceptor 415-1 and its peers in accordance with the subroutines of the flow charts of FIGS. 12 and 13 in the step 832 and it is decided in the step 835 whether to make a record of the information at the server side of the second request interaction in the step 840. If no, the invocation of the server interceptor 415-1 is completed in the step 850. If yes in the step 835, a record of the information of the interaction is made (step 840) which includes the interaction and client correlation identifications as well as the logical thread identification and sequence number. The interceptor record is added to an interceptor record list stored in the software element 415-2 in a step 845. If there are more than N records stored in the software element 415-2 in a step 847, the oldest records greater than N are removed in a step 849 and the invocation of the server interceptor 415-1 is completed (step 850). Instead of adding the interceptor records to the list and removing the oldest records, the interceptor record may be sent directly to the administrative node 450.

On completion of the second interaction between the client interceptor 405-3 and the server interceptor 415-1, the software element 415-2 processes information in accordance with the request from the software element 405-2 between times t5 and t6 in FIG. 16. At time t6, the software element 415-2 has completed the information processing requested by the software element 405-2 and initiates the reply of the second interaction to the software element 405-2. For the reply, the server interceptor 415-1 is coupled to the client interceptor 405-3 through the logical path 607 (i.e., the bus 168, the router 165, the network coupler 130, the router 115 and the bus 118) shown in FIG. 6. The server interceptor 415-1 starts the second interaction server side reply operations of the flow chart of FIG. 10 at node time 158-1.

Referring to FIG. 10, the server interceptor 415-1 is invoked in a step 1001 and the chain correlation identification C-2 of the software element 415-2 is determined in a step 1003. In a step 1004, it is decided whether the interceptor is a client side interceptor or not. Since the server interceptor 415-1 was invoked in the step 1001, a step 1007 is entered in which the current interaction correlation identification I-11 is found from the association with the chain correlation identification C2 of the software element 415-2. The association of the chain correlation identification C-2 with the current interaction correlation identification I-11 is removed in the step 1012 to disengage the software element 415-2 from the interaction and an interaction analysis is performed in a step 1014 using operations of the flow charts of FIGS. 12 and 13. In particular, the reply response time is added to the total response time of the interaction in a step 1330 before the aggregate record is stored in the software element 415-2 in the step 1330. If the server side of the reply interaction is to be recorded, a step 1016 is entered from a decision step 1015 and a record of the reply information is formed. The formed interceptor reply record is added to the stored interceptor record list in a step 1017. The invocation is completed after the older than N records are determined and removed in steps 1019 and 1023. Instead of storing the interceptor record and discarding the oldest records, the interceptor record may be sent directly to the administrative node 450. If it is decided in the step 1015 that a reply interaction record is not to be made, the complete invocation step 1025 is entered directly from the decision step 1015.

At the client side of the reply of the second interaction, the client interceptor 405-3 is invoked in the step 1001 of FIG. 10 at node time 105-2 and the chain correlation identification C-1 of the software element 405-2 is determined in a step 1003. In a step 1004, it is decided whether the interceptor is a client side interceptor or not. Since the client interceptor 405-1 was invoked in the step 1001, a step 1005 is entered for the client side of the reply. In the step 1005, the downstream interaction correlation I-11 is found from the downstream interaction correlation association with the chain correlation identification C-1. The association of the chain correlation identification C-1 with the downstream interaction correlation identification I-11 is removed in the step 1010 to disengage the software element 405-2 from the interaction and an interaction analysis is performed in a step 1014 using operations of the flow charts of FIGS. 12 and 13. As discussed with respect to the server side of the reply, the reply response time is added to the total response time of the interaction in a step 1330 before the aggregate record is stored in the software element 405-2 in the step 1330. If the client side of the reply interaction is to be recorded, a step 1016 is entered from a decision step 1014 and a reply interceptor record of the reply interaction information is formed. The formed interceptor reply record is added to the stored interceptor record list in a step 1017. The invocation is completed in the step 1025 after the older than N records are determined and removed in steps 1019 and 1023. Alternatively, the interceptor reply records may be sent directly to the administrative node. If it is decided in the step 1015 that a reply interaction record is not to be made, the complete invocation step is performed in the step 1025 directly from the decision step 1015.

The reply from the software element 415-2 to the software element 405-2 of the second interaction is completed at a time t7 in the timing diagram of FIG. 16 and the software element 405-2 continues processing. At a time t8, the software element 405-2 sends a request to the software element 410-2 for information processing through the client interceptor 405-3 and the server interceptor 410-1 to start the third interaction of table 1. The client interceptor 405-3 operates at a node time 105-3 as previously described with respect to the second interaction between the software elements 405-2 and 415-2. As listed in the client request of a the third interaction in table 1, the sequence number is incremented to 2 in the step 923 after the current interaction correlation identification 1-10 is found in the step 915 and a downstream interaction correlation identification of 1-12 is created in the step 924. The downstream interaction correlation identification 1-12 is then associated with the chain correlation identification C-1 of the software element 405-2 in the step 925 and with the downstream interaction in the step 930. The interaction is analyzed by the subroutines of FIGS. 12 and 13 in the step 932 and an interceptor record is formed and stored in the steps 940 and 945 if previously instructed by the administrative node 450. If there are more than N records stored in the software element 405-2 in the step 947, the oldest records greater than N are removed in the step 949 and the invocation of the client interceptor 405-3 is completed (step 950). Instead of adding the interceptor records to the list and removing the oldest records, the interceptor record may be sent directly to the administrative node 450.

In the third interaction, the client interceptor 405-3 of the node 105 is coupled to the to the server interceptor 410-1 of the node 158 through the logical path 609 (the bus 118, the router 115, the network coupler 130, the router 165 and the bus 168) at node time 158-2 for transmission of the request from the software element 405-2 to the software element 410-2. As shown in table 1 for the server interceptor 410-1, the chain correlation identification is determined as C-3 in the step 825 for the server interceptor 410-1 and the chain identification correlation identifier C-3 is associated with the interaction identification I-12 from the client interceptor 405-3. The interaction is analyzed by the subroutines of FIGS. 12 and 13 in the step 832.and an interceptor record is formed for the request and is stored in the steps 840 and 845 if previously instructed by the administrative node 450. If there are more than N records stored in the software element 410-2 in a step 847, the oldest records greater than N are removed in a step 849 and the invocation of the server interceptor 410-1 is completed (step 850). Instead of adding the interceptor records to the list and removing the oldest records, the interceptor record may be sent directly to the administrative node 450.

The third interaction request through the interceptors 405-3 and 410-1 is completed at a time t9 in FIG. 16 and the software element 410-2 performs the requested information processing. At a time t10, the software element 410-2 of node 158 requests information processing of software element 415-2 of the same node through the client interceptor 410-3 and the server interceptor 415-1 to start a fourth interaction. In the fourth interaction, the client server 410-3 operates at node time 158-3, as indicated in table1, to increment the sequence number to 3 in the step 923 of FIG. 9, to create a downstream interaction identification I-13 from the current interaction correlation identification I-12 in the step 924, to associate the chain correlation identification C-3 of the client interceptor 410-3 with the downstream interaction correlation identification I-13 in the step 925 and to associate the downstream interaction correlation identification I-13 with the downstream interaction in the step 930. After the interaction is analyzed in the step 932 in accordance with the subroutines of FIGS. 12 and 13, an interceptor record is formed in the steps 935 and 940 if previously instructed by the administrative node450. The interceptor record is added to the stored interaction records in the software element 410-2 (step 0.945), the oldest >N records are removed from the software element 410-2 in the steps 947 and 949 and the invocation is completed in the step 950. Instead of adding the interceptor records to the list and removing the oldest records, the interceptor record may be sent directly to the administrative node 450.

As shown in table 1 for the server interceptor 415-1 at node time 158-4 in the fourth interaction, the chain correlation identification is determined as C-4 in the step 825 of FIG. 8 and the chain identification correlation identifier C-4 is associated with the downstream interaction identification I-13 from the client interceptor 405-3. The interaction is analyzed by the subroutines of FIGS. 12 and 13 in the step 832. An interceptor record is formed for the request and is stored in the steps 840 and 845 if previously instructed by the administrative node 450. If there are more than N records stored in the software element 415-2 in a step 847, the oldest records greater than N are removed in a step 849 and the invocation of the server interceptor 415-1 is completed (step 850). Instead of adding the interceptor records to the list and removing the oldest records, the interceptor record may be sent directly to the administrative node 450. After completion of the invocations of the client interceptor 410-3 and the server interceptor 415-1 in the steps 850 and 950, the software element 415-2 performs information processing according to the request of the software element 410-2 at a time t11 in FIG. 16.

The software element 415-2 of the node 158 at node time 158-5 makes a request for information processing of the software element 420-2 of the node 101 to start the fifth interaction at a time t12 through the client interceptor 415-3 and the server interceptor 420-1 in a fifth interaction request. The client interceptor 415-3 is coupled to the server interceptor 420-1 through the logical path 615 (i.e., the bus 168, the router 165, the network coupler 130, the router 115 and bus 118) to send the request of the software element 415-2 to the software element 420-2. As shown for the fifth interaction request in table 1, the client interceptor 415-3 operates in accordance with the flow chart of FIG. 9 at the relative node time 158-5 to increment the sequence number to 4, create a downstream interaction correlation identification I-14 that is associated with the chain correlation identification C-4. The server interceptor 420-1 operates according to the flow chart of FIG. 8 at a relative node time 101-1 to associate the interaction correlation identification 1-14 obtained from the client interceptor 415-3 with the chain correlation identification C-5 of the server interceptor 420-1. Interaction analyses are performed for both the client and server interceptors, interceptor records are formed in the client and server interceptors, and the interceptor records are stored in the software elements 415-2 and 420-2 prior to the completion of the interceptor invocations.

Upon completion of its information processing for the request of the software element 415-2, the software element 420-2 sends a reply for the fifth interaction at the time t14 to the software element 415-2 through the server interceptor 420-1 and the client interceptor 415-3. The server interceptor 420-1 operates in accordance with the reply flow chart of FIG. 10 at the node time 101-2 to remove the chain correlation identification C-5 from the interaction correlation identification I-14 in the step 1012, to augment the aggregate statistics record for the software element 420-2 in the step 1014, to form the interceptor reply record and store it in the software element 420-2 in the steps 1016 and to discard the greater than N records in the steps 1019 and 1020. Instead of adding the interceptor record to the list and removing the oldest records, the interceptor reply record may be sent directly to the administrative node 450. At the node time 158-6, the client interceptor 415-3 operates according to the flow chart of FIG. 10 to remove the chain correlation identification C-4 from the interaction correlation identification I-14 of the fifth interaction in the step 1010, to augment the aggregate statistics record for the software element 415-2 in the step 1014, to form the interceptor reply record and store it in the software element 415-2 in the steps 1016 and 1017 and to discard the >N records in the steps 1019 and 1020. Instead of storing the interceptor reply record and discarding the oldest records, the interceptor record may be sent directly to the administrative node 450.

The software element 415-2 operates to reply to the information processing request of the software element 410-2 of fourth interaction at a time t15 through the server interceptor 415-1 and the client interceptor 410-3. In the reply portion of the fourth interaction at the node time 158-7, the server interceptor 415-1 at the node time 158-7 removes the chain correlation identification C-4 from the interaction correlation identification I-13 of the fourth interaction in the step 1012, augments the aggregate statistics record for the software element 415-2 in the step 1014, forms the interceptor reply record and stores it in the software element 415-2 in the steps 1016 and 1017 and discards the greater than N records in the steps 1019 and 1020. Instead of storing the interceptor reply record and discarding the oldest records, the interceptor records may be sent directly to the administrative node 450. At the node time 158-8, the client interceptor 410-3 operates according to the flow chart of FIG. 10 to remove the chain correlation identification C-3 from the interaction correlation identification I-13 of the fourth interaction in the step 1010, to augment the aggregate statistics record for the software element 410-2 in the step 1014, to form the interceptor reply record and store it in the software element 410-2 in the steps 1016 and 1017 and to discard the >N records in the steps 1019 and 1020. Alternatively, the reply records may be sent directly to the administrative node.

The software element 410-2 sends the reply of the third interaction request to the software element 405-2 through the server interceptor 410-1 and the client interceptor 405-3 at time t16. At the node time 158-9, the server interceptor 410-1 removes the association of the chain correlation identification C-3 from the interaction correlation identification I-12 of the third interaction in the step 1012, augments the aggregate statistics record for the software element 410-2 in the step 1014, forms the interceptor reply record and stores it in the software element 410-2 in the steps 1016 and 1017 and discards the greater than N records in the steps 1019 and 1020. Instead of storing the interceptor reply records and discarding the oldest records, the interceptor reply record may be sent directly to the administrative node 450. At the node time 105-4, the client interceptor 405-3 operates according to the flow chart of FIG. 10 to remove the chain correlation identification C-1 from the interaction correlation identification I-12 of the third interaction in the step 1010, to augment the aggregate statistics record for the software element 405-2 in the step 1014, to form the interceptor reply record and store it in the software element 405-2 in the steps 1016 and 1017 and to discard the greater than N records in the steps 1019 and 1020. Instead of storing the interceptor reply records and discarding the oldest records, the interceptor reply record may be sent directly to the administrative node 450.

A reply from the software element 405-2 for the first interaction request of the software element 401-2 is sent at a time t17 in FIG. 16 through the server interceptor 405-1 and the client interceptor 401-3. At the node time 105-5, the server interceptor 405-1 operates according to the flow chart of FIG. 10 to remove the association between the chain correlation identification C-1 and the interaction correlation identification I-10 of the first interaction in the step 1012, to augment the aggregate statistics record for the software element 405-2 in the step 1014, to form the interceptor reply record and store it in the software element 405-2 in the steps 1016 and 1017 and to discard the greater than N interceptor records in the software element 405-2 in the steps 1019 and 1020. At the node time 101-3, the client interceptor 401-3 operates according to the flow chart of FIG. 10 to remove the association of the chain correlation identification C-0 from the interaction correlation identification I-10 of the first interaction in the step 1010, to augment the aggregate statistics record for the software element 401-2 in the step 1014, to form the interceptor reply record and store it in the software element 401-2 in the steps 1016 and 1017 and to discard the >N records of the software element 401-2 in the steps 1019 and 1020. Instead of storing the interceptor reply records and discarding the oldest records, the interceptor record may be sent directly to the administrative node 450.

Upon completion of the network task illustrated in table 1, a set of client and server interceptor records and an aggregate statistics record relating to the task is stored in each of the software elements 401-2, 405-2, 410-2, 415-2 and 420-2. Each interceptor record includes a logical thread identifier, a chain correlation identifier and an interaction correlation identifier that may be used to correlate the interceptor records of the network task for evaluation of network operation in the administrative node 450. As shown in the steps 715 and 718 of FIG. 7A, the administrative node 450 may request and receive the interceptor records of the software elements to perform the network analysis illustrated in the flow chart of FIG. 7B. While the administrative node may request interceptor records from any of the selected software elements and in any order, it is assumed in this example that the interceptor records received from the software elements 401-2, 405-2, 410-2, 415-2 and 420-2 are stored in the administrative node in that order.

Figure 11:
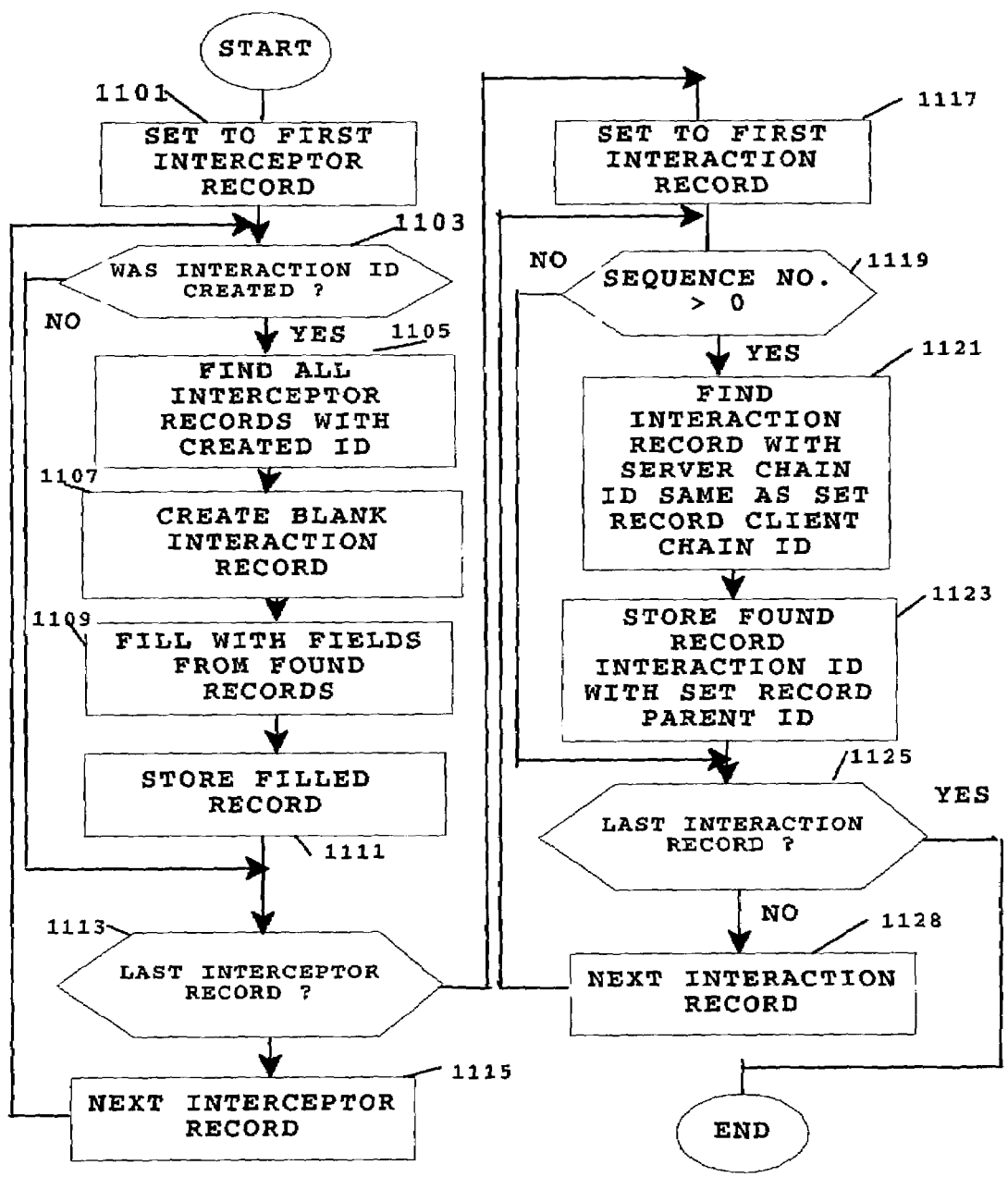
FIG. 11 is a flow chart showing combining operations of the administrative node in accordance with the embodiment of the invention.

FIG. 11 illustrates one arrangement for correlating the interceptor records to form interaction records for analysis. Referring to FIG. 11, the first interceptor record of the client interceptor 401-3 is set to be addressed in a step 1101 and it is determined from the record that an interaction correlation identification I-10 was created in the first interaction at the node time 101-0. All interceptor records with the created interaction correlation identification I-10 (i.e., the request and reply interceptor records of the client interceptor 401-3 at the node times 101-0 and 101-3 and the request and reply interceptor records of the server interceptor 405-1 at the node times 105-0 and 105-5) are found (step 1105). A blank interaction record is formed in the step 1107 and the information from the interceptor records are entered into the fields of the blank interaction record in a step 1109. The filled-in interaction record is stored in a step 1111. Until the last interceptor record is found in a step 1113, the next interceptor record that is addressed in a step 115 is processed to generate an interaction record in the loop from the step 1103 to the step 1115.

It is determined in the step 1103 from interceptor record of the server interceptor 405-3 for the second interaction that the interaction correlation identification I-11 was created at the node time 105-1. The request and reply interceptor records with the interaction correlation identification I-11 of the client interceptor 405-3 at the node times 105-1 and 105-2 and of the server interceptor 415-1 at the node times 158-0 and 158-1 are found in the step 1105 and the information of these records are entered into the fields of a newly created interaction record that is stored in the administrative node (steps 1107, 1109 and 111). For the interceptor record of the client interceptor 405-3 of the third interaction, the interaction correlation identification I-12 was created at the node time 105-3. Accordingly, an interaction record is formed and stored for the request and reply interceptor records of client interceptor 405-3 at the node times 105-3 and 105-4 and of the server interceptor 410-1 at the node times 158-2 and 158-9 in the loop from the step 1103 to the step 1115.

For the fourth interaction, the interaction correlation identification I-13 was created in the interceptor record of the client interceptor 410-3 at the node time 158-3. As a result, information from the request and reply interceptor records of the client interceptor 410-3 at the node times 158-3 and 158-8 and the request and reply interceptor records of the server interceptor 415-1 at the node times 158-4 and 158-7 are entered into an interaction record for the fourth interaction in the loop from the step 1103 to the step 1115 in FIG. 11. With respect to the fifth interaction, the interaction correlation identification I-14 is determined as created in the interceptor record of the client interceptor 415-3 (step 1103) at the node time 158-5 so that the request and reply interceptor information of the client interceptor 415-3 at the node times 158-5 and 158-6 and the request and reply interceptor information of the server interceptor 420-1 at the node times 101-1 and 101-2 are entered into the fields of a newly created interaction record for the fifth interaction that is stored in the administrative node.

After the last interceptor record is processed, a step 1117 is entered from the step 1111 of FIG. 11. In the step 1117, the first interaction record formed in the loop from the step 1103 to the step 1115 is set for processing. In the loop from the step 1119 to the step 1128, the parent child relationship of the interaction records is determined and the sequential operating relationship of the interactions is recorded. For the first interaction record, the sequence number is zero. Control is passed from the decision step 1119 to the step 1128 through the decision step 1125 and the second interaction record is selected for processing. Table 2 lists a portion of the interaction records formed in the steps 1107 and 1109 and stored in the step 1111.

As shown in Table 2, there is no parent interaction identification for the first interaction of the network task since the task was initiated in the software element 401-2. For the second interaction, the sequence number one in decision step 1119 transfers control to a step 1121 in which the server chain correlation identification C-1 of the first interaction is found to be the same as the client correlation identification of the second interaction. In response to the match of chain correlation identifications in the step 1121, the parent interaction correlation identification in the second interaction record is set as I-10 denoting the parent-child relationship of the first and second interactions. In the processing for the third interaction in the loop from the step 1119 to the step 1128, the server interceptor chain correlation identification C1 of the first interaction record is found to match the client interceptor chain correlation identification C1 of the third interaction (step 1121) so that the interaction correlation identification I-10 of the first interaction is entered in the third interaction record as the parent interaction correlation identification.

With respect to the interaction record of the fourth interaction in FIG. 11, the server interceptor chain correlation identification of the third interaction is found to be the same as the fourth interaction client interceptor chain correlation identification C3 so that the interaction correlation identification I-12 of the third interaction record is entered as the parent interaction correlation identification in the interaction record of the fourth interaction in Table 2 in the step 1123. In like manner, the server interceptor chain correlation identification of the fourth interaction is found to be the same as the client interceptor chain correlation identification of the fifth interaction and the interaction correlation identification I-13 of the fourth interaction is recorded as the parent interaction correlation identification in the interaction record of the fifth interaction. As seen from Table 2, the exact flow and the relative timing order of the interactions of the network task and which interactions triggered other interactions can be determined from the interaction records for use in a network analysis in the step 732 of FIG. 7B. Using Table 2, an administrator of the network can determine the exact sequence of events within a network task and the dependencies among software elements. If an error is detected in any interaction, the administrator can determine all the interactions within the same network task including those occurring before and after the detection of the error to aid in determining the root cause of the failure.

While the invention has been described by way of a particular illustrative embodiment, it is to be understood that the invention is not limited to the above-described embodiments but that those of ordinary skill in the art may make various changes and modifications without departing from the scope and spirit of the invention. Accordingly, the

TABLE 2

| INTER ACTN | INTER. ID | PAR. INT. ID | REQ. Client Time | Reply Client Time | REQ. Server Time | Reply Server Time | Client Node | Server Node | Client SW Elem. | Server SW Elem. | Client Chain ID | Server Chain ID | SEQ. NO. |
|---|---|---|---|---|---|---|---|---|---|---|---|---|---|
| FIRST | I-10 |  | 101-0 | 101-3 | 105-0 | 105-5 | 101 | 105 | 401-2 | 405-2 | C-0 | C-1 | 0 |
| SECND | I-11 | I-10 | 105-1 | 105-2 | 158-0 | 158-1 | 105 | 158 | 405-2 | 415-2 | C-1 | C-2 | 1 |
| THIRD | I-12 | I-10 | 105-3 | 105-4 | 158-2 | 158-9 | 105 | 158 | 405-2 | 410-2 | C-1 | C-3 | 2 |
| FOURTH | I-13 | I-12 | 158-3 | 158-7 | 158-4 | 158-8 | 158 | 158 | 410-2 | 415-2 | C-3 | C-4 | 3 |
| FIFTH | I-14 | I-13 | 158-5 | 158-6 | 101-1 | 101-2 | 158 | 101 | 415-2 | 420-2 | C-4 | C-5 | 4 | foregoing embodiments should not be construed as limiting the scope of the invention, which is encompassed instead by the following claims.

What is claimed is:

1. A computer network interconnecting a plurality of service providing nodes each including software elements for performing computer network tasks and an administrative node for monitoring the computer network tasks, at least one of the service providing nodes comprising:

a plurality of software elements in an application layer of the service providing node for coupling to other software elements in the same application layer and in the application layers of other service providing nodes of the network to process operations of the network;

an interceptor unit for each software element of the at least one service providing node, the interceptor unit being coupled to its software element in response to selection of the software element by the administrative node for intercepting transmissions in the application layer from the selected software element to other software elements in the same and different service providing nodes and for intercepting transmissions in the application layer to the selected software element from other software elements in the same and different service providing nodes wherein said interceptor unit further forms a record of information pertaining to the transmissions at the selected software element and each record of transmission pertaining information further comprises a chain correlation identifier to identify an operation of a selected software element in its performance of a network task and an interaction correlation identifier to identify an interaction of a selected software element with another software element; and a transfer unit responsive to a transfer command from the administrative node to the selected software element for transferring the record pertaining to transmission pertaining information from the interceptor unit to the administrative node, in order to monitor operations of network tasks.

2. The computer network according to claim 1, wherein the interceptor unit comprises a first interceptor coupled to the selected software element to intercept the transmissions from the selected software element and a second interceptor is coupled to the selected software element to intercept the transmissions to the selected software element.

3. The computer network according to claim 2, wherein the administrative node includes a selection unit for selecting the software elements in which the first and second interceptors are coupled to the selected software elements.

4. The computer network according to claim 3, wherein each selected software element includes a storage unit for storing the transmission information pertaining records of the first and second interceptors coupled to the selected software element.

5. The computer network according to claim 3, wherein the administrative node further comprises a combining unit for combining the transmission information pertaining records from selected software elements to form a set of records of interactions of the selected software elements of the service providing nodes.

6. The computer network according to claim 5, wherein each transmission information pertaining record of a selected software element includes a logical thread identifier identifying a network task of the selected software element, and wherein the combining unit includes a network task record forming unit responsive to the logical thread identifier of the information pertaining records for forming a group of the transmission information pertaining records of the network task.

7. The computer network according to claim 6, wherein the combining unit includes an interaction record forming unit responsive to the chain correlation identifiers and the interaction correlation identifiers for generating a set of interaction records including data of transmission information pertaining records of the network task.

8. The computer network according to claim 2, wherein the first interceptor is inserted at an outgoing side of the selected software element isolated from the operation of the selected software element and the second interceptor is inserted at an incoming side of the selected software element isolated from the operation of the selected software element so that the operation of the selected software element is not affected by the inserted first and second interceptors.

9. The computer network according to claim 1, wherein the information pertaining to transmission recorded at the interceptor includes data of at least one of response time and error states of an interaction between the selected software element and another software element and data of a time of occurrence of the interaction.

10. The computer network according to claim 1, wherein the selected software element further comprises a statistics forming unit responsive to the transmission pertaining information at the interceptor unit coupled to the selected software element for forming data of at least one of interaction counts, failure counts, average response time of the selected software element, average response time of the selected software element when serving requests from another specific software element, percentage of calls to a specific software element that came from another specified software element and percentage of calls from a specified software element that are sent to another specified software element.

11. The computer network according to claim 2, wherein the first interceptor coupled to the selected software element initiating a network task generates a network task identifier for transmission to the software elements engaged in the network task.

12. The computer network according to claim 11, wherein the coupled first interceptor in a selected software element sending a request transmission provides an identifier identifying an operation of the selected software element and an identifier identifying an interaction between the selected software element and a software element receiving the request transmission associates the selected software element operation identifier with the interaction identifier.

13. The computer network according to claim 12, wherein, in the request transmission to a receiving selected software element, the second interceptor of the selected receiving software element provides an identifier identifying the operation of the receiving software element, associates the receiving software element identifier with the interaction identifier identifying the interaction between the selected receiving software element and the selected software element sending the request transmission and records the interaction identifier.

14. The computer network according to claim 13, wherein, in a reply transmission from the selected software element receiving the request, the second interceptor coupled to the selected software element sending the reply transmission removes the association of the interaction identification with the software element operation identifier.

15. The computer network according to claim 14, wherein, in a reply transmission to the selected software element receiving the reply, the first interceptor coupled to the selected software element receiving the reply transmission, removes the association of the interaction identification with the software element operation identifier.

16. The computer network according to claim 1, wherein the interceptor of the selected software element includes a detector for detecting an at least one of an error and a failure in the transmission pertaining information and further includes a notifying unit for notifying the examining unit of a network task being processed by the selected software element.

17. The computer network according to claim 16, wherein the administrative node further includes an analysis unit, responsive to the notification, for requesting information pertaining records of the network task in which the at least one of the error and the failure is detected from the selected software elements.

18. The computer network according to claim 1, wherein the information pertaining to transmission recorded at the interceptor unit includes data of at least one of response time and error states of an interaction between the selected software element and another software element and data of a time of occurrence of the interaction.

19. The computer network according to claim 1, wherein the selected software element further comprises a statistics forming unit responsive to the transmission pertaining information at the interceptor coupled to the selected software element for forming data of at least one of interaction counts, failure counts, average response time of the selected software element, average response time of the selected software element when serving requests from another specific software element, percentage of calls to a specific software element that came from another specified software element and percentage of calls from a specified software element that are sent to another specified software element.

20. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements comprising:

selecting, by the administrative node, software elements for monitoring software element interactions between software elements in an application layer of the same service providing node and application layers of different service providing nodes; and intercepting transmissions in the application layer from a selected software element to software elements in the same and in the different service providing modules and transmissions in the application layer to the selected software element from software elements in the same and in the different service providing nodes at an interceptor unit coupled to the selected software element to form a record of information pertaining to the transmissions at the selected software element that further comprises a chain correlation identifier to identify an operation of a selected software element in its performance of a network task and an interaction correlation identifier to identify an interaction of a selected software element with another software element; and transferring said information record pertaining to the transmissions to said administrative node, which further comprises forming an interaction record that is responsive to both a chain correlation identifier and a interaction correlation identifier and generating a set of interaction records, which include data from both records of transmission pertaining information and records of performance of a network task, and enabling the administrative node for monitoring operations of network tasks responsive to the recorded transmission pertaining information.

21. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 20, wherein the transmissions from the selected software element are intercepted by a first interceptor and the transmissions to the selected software element are intercepted by a second interceptor.

22. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 21, wherein the monitoring includes selecting software elements in which the first and second interceptors are coupled to the selected software elements.

23. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 22, wherein the transmission information pertaining records of the first and second interceptors coupled to the selected software element are stored in the selected software element.

24. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 22, wherein the monitoring at the administrative node comprises combining the transmission information pertaining records from selected software elements to form a set of records of interactions of the selected software elements of the service providing nodes.

25. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 24, wherein said information record pertaining to the transmissions is of a selected software element and includes a logical thread identifier identifying a network task of the selected software element, and wherein the combining step includes forming a group of the information pertaining records of the network task responsive to the logical thread identifier of the information pertaining records.

26. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 21, wherein the first interceptor is inserted at an outgoing side of the selected software element isolated from the operation of the selected software element and the second interceptor is inserted at an incoming side of the selected software element isolated from the operation of the selected software element so that the operation of the selected software element is not affected by the inserted first and second interceptors.

27. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 20, wherein said information record pertaining to the transmissions includes data of at least one of response time and error states of an interaction between the selected software element and another software element and data of a time of occurrence of the interaction.

28. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 20 further comprising forming an interaction record comprising a statistical record responsive to the transmission pertaining information at the interceptor coupled to the selected software element including data of at least one of interaction counts, failure counts, average response time of the selected software element, average response time of the selected software element when serving requests from another specific software element, percentage of calls to a specific software element that came from another specified software element and percentage of calls from a specified software element that are sent to another specified software element.

29. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 21, wherein the step of enabling the administrative node further comprises initiating a network task by generating a network task identifier in a selected software element initiating the network task for transmission to the software elements engaged in the network task.

30. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 29, wherein, in a selected software element sending a request transmission, an identifier identifying an operation of the selected software element and an identifier identifying an interaction between the selected software element and a software element receiving the request transmission are provided by the first interceptor and the software element operation identifier is associated with the interaction identifier.

31. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 30, wherein, in the request transmission to a receiving selected software element, an identifier identifying the operation of the receiving selected software element is provided by the second interceptor of the receiving selected software element, the receiving software element identifier is associated with the interaction identifier identifying the interaction between the selected receiving software element and the software element sending the request transmission and the interaction identifier and the interaction identifier is recorded by the second interceptor of the receiving software element.

32. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to 32, wherein, in a reply transmission from the selected software element receiving the request, the association of the interaction identifier with the software element identifier is removed in the second interceptor coupled to the selected software element sending the reply transmission.

33. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 32, wherein, in a reply transmission to the selected software element receiving the reply, the association of the interaction identification with the software element operation identifier is removed in the first interceptor coupled to the selected software element receiving the reply transmission.

34. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 20, wherein at least one of an error and a failure in the transmission pertaining information is detected in the interceptor of the selected software element and the administrative node is notified of the detected at least one of the error and the failure by the selected software element.

35. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 34, wherein the administrative node requests transmission pertaining information records of the network task in which the at least one of the error and the failure is detected from the selected software elements responsive to notification of the at least one of the error and the failure.

36. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 20, wherein said information record pertaining to the transmissions includes data of at least one of response time and error states of an interaction between the selected software element and another software element and data of a time of occurrence of the interaction.

37. In a computer network interconnecting a plurality of service providing nodes each service providing node comprising software elements for performing computer network tasks and an administrative node for monitoring the computer network tasks, at least one service providing node including a plurality of software elements, a method of monitoring interactions among software elements according to claim 20 wherein the generating of interaction records further comprises forming a statistical record responsive to the transmission pertaining information at the interceptor coupled to the selected software element including data of at least one of interaction counts, failure counts, average response time of the selected software element, average response time of the selected software element when serving requests from another specific software element, percentage of calls to a specific software element that came from another specified software element and percentage of calls from a specified software element that are sent to another specified software element.

38. A system for monitoring operations of a computer network interconnecting service providing nodes and an administrative node monitoring computer network tasks, comprising:

software elements at each service providing node, with at least one service providing node including a plurality of software elements, for interacting with other software elements in an application layer of the same service providing node and in different service providing nodes for processing operations of the network;

intercepting means coupled in a monitoring mode to a software element selected by the administrative node for intercepting transmissions in the application layer from the selected software element to other software elements in the same and in the different service providing nodes in the network and transmissions in the application layer to the selected software element from other software elements in the same and in the different service providing nodes in the network to form a record of information pertaining to the transmissions at the selected software element that further comprises a chain correlation identifier to identify an operation of a selected software element in its performance of a network task and an interaction correlation identifier to identify an interaction of a selected software element with another software element;

transferring means for transferring the record of information pertaining to the transmissions to the administrative node; and monitoring means at the administrative node responsive to the record of information pertaining to the transmissions for monitoring operations of network tasks.

39. A system for monitoring operations of a computer network interconnecting service providing nodes and an administrative node monitoring computer network tasks according to claim 38, wherein the intercepting means comprises first intercepting means coupled to the selected software element to intercept transmissions from the selected software element to other software elements in the same and different service providing nodes and second intercepting means coupled to the selected software element to intercept transmissions to the selected software element from the other software elements in the same and different service providing nodes.

40. A system for monitoring operations of a computer network interconnecting service providing nodes and an administrative node monitoring computer network tasks according to claim 39, wherein the administrative node includes selection means for selecting the software elements to which the first and second intercepting means are coupled to the software element.

41. A system for monitoring operations of a computer network interconnecting service providing nodes and an administrative node monitoring computer network tasks according to claim 40, wherein each selected software element includes storage means for storing the record of information pertaining to the transmissions from the first and second intercepting means coupled to the selected software element.

42. A system for monitoring operations of a computer network interconnecting service providing nodes and an administrative node monitoring computer network tasks according to claim 40, wherein the administrative node comprises combining means for combining the record of information pertaining to the transmissions from selected software elements to form a set of records of interactions of the software elements of the service providing nodes.

43. A system for monitoring operations of a computer network interconnecting service providing nodes and an administrative node monitoring computer network tasks according to claim 42, wherein each of the set of records of information pertaining to the transmissions of a selected software element includes a logical thread identifier identifying a network task of the selected software element, and wherein the combining means includes network task record forming means responsive to the logical thread identifier of the information pertaining records for forming a group of the information pertaining records of the network task.

44. A system for monitoring operations of a computer network interconnecting service providing nodes and an administrative node monitoring computer network tasks according to claim 39, wherein the first intercepting means is inserted at an outgoing side of the selected software element isolated from the operation of the selected software element and the second intercepting means is inserted at an incoming side of the selected software element isolated from the operation of the selected software element so that the operation of the selected software element is not affected by the inserted first and second intercepting means.

45. A system for monitoring operations of a computer network interconnecting service providing nodes and an administrative node monitoring computer network tasks according to claim 38, wherein the information pertaining to transmission recorded at the intercepting means includes data of at least one of response time and error states of an interaction between the selected software element and another software element and data of a time of occurrence of the interaction.

46. A system for monitoring operations of a computer network interconnecting service providing nodes and an administrative node monitoring computer network tasks according to claim 38, wherein the chain correlation identifier further comprises a selected software element comprising a statistics forming means responsive to the transmission pertaining information at the intercepting means coupled to the selected software element for forming data of at least one of interaction counts, failure counts, average response time of the selected software element, average response time of the selected software element when serving requests from another specific software element, percentage of calls to a specific software element that came from another specified software element and percentage of calls from a specified software element that are sent to another specified software element.

47. A system for monitoring operations of a computer network interconnecting service providing nodes and an administrative node monitoring computer network tasks according to claim 39, wherein, the chain correlation identifier further comprises a selected software element initiating a network task, the first intercepting means coupled to the selected software element generates a network task identifier for transmission to the software elements engaged in the network task.

48. A system for monitoring operations of a computer network interconnecting service providing nodes and an administrative node monitoring computer network tasks according to claim 47, wherein, the chain correlation identifier further comprises a selected software element sending a request transmission, the coupled first intercepting means provides an identifier identifying an operation of the selected software element and an identifier identifying an interaction between the selected software element and a software element receiving the request transmission and associates the selected software element operation identifier with the interaction identifier.

49. A system for monitoring operations of a computer network interconnecting service providing nodes and an administrative node monitoring computer network tasks according to claim 48, wherein, in the request transmission to a selected receiving software element, the second intercepting means of the selected receiving software element provides an identifier identifying the operation of the selected receiving software element, associates the selected receiving software element identifier with the interaction identifier identifying the interaction between the selected receiving software element and the selected software element sending the request transmission and records the interaction identifier.

50. A system for monitoring operations of a computer network interconnecting service providing nodes and an administrative node monitoring computer network tasks according to 48, wherein, in a reply transmission from the selected software element receiving the request, the second intercepting means coupled to the selected software element sending the reply transmission removes the association of the interaction identification with the selected software element operation identifier.

51. A system for monitoring operations of a computer network interconnecting service providing nodes and an administrative node monitoring computer network tasks according to claim 50, wherein, in a reply transmission to the selected software element receiving the reply, the first intercepting means coupled to the selected software element receiving the reply transmission, removes the association of the interaction identification with the selected software element operation identifier.

52. A system for monitoring operations of a computer network interconnecting service providing nodes and an administrative node monitoring computer network tasks according to claim 38, wherein the intercepting means of the selected software element includes detecting means for detecting an at least one of an error and a failure in the transmission pertaining information and further includes notifying means for notifying the administrative node of a network task being processed by the selected software element.

53. A system for monitoring operations of a computer network interconnecting service providing nodes and an administrative node monitoring computer network tasks according to claim 52, wherein the administrative node chain correlation identifier further comprises analyzing means, responsive to the notification, for requesting information pertaining records of the network task in which the at least one of the error and the failure is detected from the selected software elements.

54. A system for monitoring operations of a computer network interconnecting service providing nodes and an administrative node monitoring computer network tasks according to claim 38 wherein the information pertaining to transmission recorded at the intercepting means includes data of at least one of response time and error states of an interaction between the selected software element and another software element and data of a time of occurrence of the interaction.

55. A system for monitoring operations of a computer network interconnecting service providing nodes and an administrative node monitoring computer network tasks according to claim 38, wherein the chain correlation identifier further comprises statistics forming means responsive to the transmission pertaining information at the intercepting means coupled to the selected software element for forming data of at least one of interaction counts, failure counts, average response time of the selected software element, average response time of the selected software element when serving requests from another specific software element, percentage of calls to a specific software element that came from another specified software element and percentage of calls from a specified software element that are sent to another specified software element.

56. A computer network interconnecting a plurality of service providing nodes each including software elements for performing computer network tasks and an administrative node for monitoring the computer network tasks, at least one of the service providing nodes comprising:

a plurality of software elements in an application layer of the service providing node for coupling to other software elements in the same application layer and in the application layers of other service providing nodes of the network to process operations of the network;

an interceptor unit for each software element of the at least one service providing node, the interceptor unit being coupled to its software element in response to selection of the software element by the administrative node for intercepting transmissions in the application layer from the selected software element to other software elements in the same and different service providing nodes and for intercepting transmissions in the application layer to the selected software element from other software elements in the same and different service providing nodes wherein said interceptor unit further forms a record of information pertaining to the transmissions at the selected software element and each record of transmission pertaining information further comprises a chain correlation identifier to identify an operation of a selected software element in its performance of a network task and an interaction correlation identifier to identify an interaction of a selected software element with another software element; and a transfer unit responsive to a transfer command from the administrative node to the selected software element for transferring the record pertaining to transmission pertaining information from the interceptor unit to the administrative node, which further comprises an interaction record forming unit that is responsive to both a chain correlation identifier and a interaction correlation identifier and generates a set of interaction records which include data from both records of transmission pertaining information and records of performance of a network task in order to enable the administrative node to monitor operations of network tasks.

* * * * *